US009094303B2

(12) United States Patent
Kanada et al.

(10) Patent No.: US 9,094,303 B2
(45) Date of Patent: Jul. 28, 2015

(54) METHOD FOR MANAGING NETWORK SYSTEM

(71) Applicant: Hitachi, Ltd., Tokyo (JP)

(72) Inventors: Yasusi Kanada, Tokyo (JP); Akihiko Takase, Tokyo (JP); Toshiaki Tarui, Kanagawa (JP)

(73) Assignee: Hitachi, Ltd., Tokyo (JP)

( * ) Notice: Subject to any disclaimer, the term of this patent is extended or adjusted under 35 U.S.C. 154(b) by 286 days.

(21) Appl. No.: 13/671,028

(22) Filed: Nov. 7, 2012

(65) Prior Publication Data

US 2013/0311623 A1 Nov. 21, 2013

(30) Foreign Application Priority Data

Nov. 8, 2011 (JP) ................................ 2011-244516

(51) Int. Cl.
*G06F 15/177* (2006.01)
*H04L 12/24* (2006.01)
*H04L 12/46* (2006.01)

(52) U.S. Cl.
CPC ........ *H04L 41/0806* (2013.01); *H04L 12/4625* (2013.01)

(58) Field of Classification Search
CPC ............................ H04L 41/0806; H04L 12/24
USPC .................................................. 709/221, 200
See application file for complete search history.

(56) References Cited

U.S. PATENT DOCUMENTS 5,438,614 A * 8/1995 Rozman et al. ............ 379/93.08
5,651,006 A * 7/1997 Fujino et al. .................. 370/408
5,715,238 A * 2/1998 Hall et al. ..................... 370/242
8,005,090 B2 * 8/2011 Nakamichi et al. ...... 370/395.21
2002/0147784 A1 * 10/2002 Gold et al. .................... 709/208
2002/0198994 A1 * 12/2002 Patton et al. .................. 709/225
2004/0081105 A1 * 4/2004 Shimazaki et al. ........... 370/254
2005/0141482 A1 * 6/2005 Kleiner ......................... 370/352
2007/0192447 A1 * 8/2007 Huynh et al. ................. 709/220
2011/0149968 A1 6/2011 Kim
2012/0089707 A1 4/2012 Baba et al.
2012/0257621 A1 * 10/2012 Ishii et al. ..................... 370/389

OTHER PUBLICATIONS

Kanada, Yasusi, et al.; Development Method and Experience of a Non-IP Protocol Using the Virtualization Nodes; IEICE Technical Report, Dec. 17, 2010; pp. 1-6.

Bates, John, et al.; Using Events for the Scalable Federation of Heterogeneous Components; Proceedings of the 8th ACM SIGOPS European Workshop on Support for Composing Distributed Applications; Sintra, Portugal, Sep. 7-10, 1998; pp. 58-65.

The ATM Forum Technical Committee; Private Network-Network Interface Specification Version 1.0 (PNNI 1.0); Mar. 1996; pp. v-vi, 13-38.

* cited by examiner

*Primary Examiner* — Anthony Mejia
*Assistant Examiner* — Jihad Boustany
(74) *Attorney, Agent, or Firm* — Foley & Lardner LLP

(57) ABSTRACT

Interdomain federation, generation or management of a virtual network (slice) that extends among domains can be performed without changing a function of a server or a node of a network domain without a function to manage the other domain. Pseudo node receiving a management message with the same protocol as a general node is added, in interdomain management information from an own domain, the other domain part in management information is received as the management information by the pseudo node (the other domain part is concealed) and when interdomain management information is transmitted to the other domain through the pseudo node by a federation protocol and the pseudo node and the interdomain management information is received from the other domain, the other domain part in the management information is bound as the management information of the pseudo node and transmitted to a management server of own domain.

14 Claims, 18 Drawing Sheets

PSEUDO NODE TABLE 701

| DOMAIN | PSEUDO NODE |
| --- | --- |
| D1 | P21 |
| D3 | P22 |
| ... | ... |

FIG. 9A

IN-DOMAIN INTER-DOMAIN ADDRESS CORRESPONDENCE TABLE

901

| LINK NAME | OLD VLAN ID | OLD MAC ADDRESS | NEW VLAN ID | NEW MAC ADDRESS |
|---|---|---|---|---|
| VL14 | 100 | x.x.x.x.x.x | 102 | b.b.b.b.b.b |
| VL23 | 101 | z.z.z.z.z.z | 103 | d.d.d.d.d.d |
| ... | ... | ... | ... | ... |

FIG. 9B

IN-DOMAIN INTER-DOMAIN ADDRESS CORRESPONDENCE TABLE

902

| LINK NAME | OLD GRE KEY | OLD IP ADDRESS | NEW GRE KEY | NEW IP ADDRESS |
|---|---|---|---|---|
| VL14 | 1000 | x.x.x.x | 1002 | b.b.b.b |
| VL23 | 1001 | z.z.z.z | 1003 | d.d.d.d |
| ... | ... | ... | ... | ... |

FIG. 9C

IN-DOMAIN INTER-DOMAIN ADDRESS CORRESPONDENCE TABLE

903

| LINK NAME | OLD VLAN ID | OLD MAC ADDRESS | NEW GRE KEY | NEW IP ADDRESS |
|---|---|---|---|---|
| VL14 | 100 | x.x.x.x.x.x | 1002 | b.b.b.b |
| VL23 | 101 | z.z.z.z.z.z | 1003 | d.d.d.d |
| ... | ... | ... | ... | ... |

FIG. 9D

IN-DOMAIN INTER-DOMAIN ADDRESS CORRESPONDENCE TABLE

904

| LINK NAME | OLD GRE KEY | OLD IP ADDRESS | NEW VLAN ID | NEW MAC ADDRESS |
|---|---|---|---|---|
| VL14 | 1000 | x.x.x.x | 102 | b.b.b.b.b.b |
| VL23 | 1001 | z.z.z.z | 103 | d.d.d.d.d.d |
| ... | ... | ... | ... | ... |

FIG. 10

SLICE INFORMATION

501

```
<slice name="S">
 <vnode name="VN1" pnode="N11">
  <ports><port name="p1"/><port name="p2"/></ports>
 </vnode>
 <vnode name="VN2" pnode="N12">
  <ports><port name="p1"/><port name="p2"/></ports>
 </vnode>
 <vnode name="VNP" pnode="P11">
  <ports><port name="p3"/><port name="p4"/></ports>
  <internal>
   <vnode name="VN3" pnode="N21">
    <ports><port name="p1"/><port name="p2"/></ports>
   </vnode>
   <vnode name="VN4" pnode="N22">
    <ports><port name="p1"/><port name="p2"/></ports>
   </vnode>
   <vlink name="VL34">
    <endpoints><endpoint vnode="VN3" port="p1"/><endpoint vnode="VN4" port="p2"/></endpoints>
   </vlink>
   <vlink name="VL24">
    <endpoints><endpoint vnode="VN3" port="p4"/><endpoint port="p4"/></endpoints>
   </vlink>
   <vlink name="VL13">
    <endpoints><endpoint vnode="VN4" port="p3"/><endpoint port="p3"/></endpoints>
   </vlink>
  </internal>
 </vnode>
 <vlink name="VL12">
  <endpoints><endpoint vnode="VN1" port="p1"/><endpoint vnode="VN2" port="p2"/></endpoints>
 </vlink>
 <vlink name="VL1P">
  <endpoints><endpoint vnode="VN1" port="p2"/><endpoint vnode="VNP" port="p3"/></endpoints>
 </vlink>
 <vlink name="VL2P">
  <endpoints><endpoint vnode="VN2" port="p1"/><endpoint vnode="VNP" port="p4"/></endpoints>
 </vlink>
</slice>
```

| | | | | |
|---|---|---|---|---|
| Set_Path | "VL14" | VLAN = 100 | MACgw = x.x.x.x.x.x | MACn = 0 |

| | | | | |
|---|---|---|---|---|
| OK | "VL14" | VLAN = 100 | MACgw = x.x.x.x.x.x | MACn = y.y.y.y.y.y |

| | | | | |
|---|---|---|---|---|
| Set_Path | "VL23" | VLAN = 101 | MACgw = z.z.z.z.z.z | MACn = 0 |

| | | | | |
|---|---|---|---|---|
| OK | "VL23" | VLAN = 101 | MACgw = z.z.z.z.z.z | MACn = u.u.u.u.u.u |

| | | | | |
|---|---|---|---|---|
| Set_Path | "VL14" | GREkey = 1000 | IPgw = x.x.x.x | IPn = 0 |

| | | | | |
|---|---|---|---|---|
| OK | "VL14" | GREkey = 1000 | IPgw = x.x.x.x | IPn = y.y.y.y |

| | | | | |
|---|---|---|---|---|
| Set_Path | "VL23" | GREkey = 1001 | IPgw = z.z.z.z | IPn = 0 |

| | | | | |
|---|---|---|---|---|
| OK | "VL23" | GREkey = 1001 | IPgw = z.z.z.z | IPn = u.u.u.u |

| |
|---|
| Set_Int_Path |
| "VL14" |
| VLAN = 100 |
| MACgw = x.x.x.x.x.x |
| MACn = y.y.y.y.y.y |
| "VL23" |
| VLAN = 101 |
| MACgw = z.z.z.z.z.z |
| MACn = u.u.u.u.u.;u |

| |
|---|
| Set_Int_Path |
| "VL14" |
| GREkey = 1000 |
| IPgw = x.x.x.x |
| IPn = y.y.y.y |
| "VL23" |
| GREkey = 1001 |
| IPgw = z.z.z.z |
| IPn = u.u.u.u |

| |
|---|
| Set_Ext_Path |
| "VL14" |
| VLAN = 102 |
| MACthis = a.a.a.a.a.a |
| MACother = b.b.b.b.b.b |
| "VL23" |
| VLAN = 103 |
| MACthis = c.c.c.c.c.c |
| MACother = d.d.d.d.d.d |

| |
|---|
| Set_Ext_Path |
| "VL14" |
| GREkey = 1002 |
| IPthis = a.a.a.a |
| IPother = b.b.b.b |
| "VL23" |
| GREkey = 1003 |
| IPthis = c.c.c.c |
| IPother = d.d.d.d |

(d) STANDARD SLICE INFORMATION

METHOD FOR MANAGING NETWORK SYSTEM

CLAIM OF PRIORITY

The present application claims priority from Japanese patent application JP2011-244516 filed on Nov. 8, 2011, the content of which is hereby incorporated by reference into this application.

BACKGROUND OF THE INVENTION

The present invention relates to a network, and particularly, to a network that extends among a plurality of domains.

In a network, domains managed by different network management servers or a domain (for example, an autonomous system (AS) on the Internet) controlled according to one policy is present. When a network service (hereinafter, referred to as an interdomain service) that extends among the plurality of domains intends to be developed, in the case where system models of both parts correspond to each other and control and management information for each of the models is interconverted to perform setting, controlling, and management throughout the plurality of domains, it is considered that setting, controlling, and the management can be more easily performed than a case where the setting, controlling, and management cannot be performed.

The control and management information needs to be transmitted and received among domains in order to implement the interdomain service, but methods therefor include a centralized management method of performing management by using a small number of mechanisms such as a network management server as above and a distributive control method of performing a control by transmitting and receiving a control message among general nodes or control nodes which are distributed in the domains.

(Federation on Centralized Management)

Therebetween, in regard to a setting and management method of the interdomain service by the centralized management method, an example of applying a comparatively loose centralized control method to a virtual network (hereinafter, referred to as a slice) is disclosed in US Patent Application Publication No. 2011/0149968, "Method for Controlling Internet Network". In US Patent Application Publication No. 2011/0149968, "Method for Controlling Internet Network", a network management server (clearing house, aggregate manager) performs only issuing of an identifier of the slice and authentication and authorization and an authorized user (service provider) directly performs setting or management operations of resources of each domain by using an access key acquired from the network management server. In US Patent Application Publication No. 2011/0149968, "Method for Controlling Internet Network", each network management server handles only a resource enclosed in a management region thereof and does not handle resources that extends among a plurality of regions or a plurality of management domains like network link resources (virtual link resources).

Further, "Development Method and Experience of A Non-IP Protocol Using the Virtualization Nodes" written by Kanada Yasusi and Nakao Akihiro, IEICE Technical Committee on Internet Architecture, Phrases 3.2, 4.1, and 4.2 of Chapter 2, 2010-12-17 discloses an example of adopting the centralized management method which is more centralized. In "Development Method and Experience of A Non-IP Protocol Using the Virtualization Nodes" written by Kanada Yasusi and Nakao Akihiro, IEICE Technical Committee on Internet Architecture, Phrases 3.2, 4.1, and 4.2 of Chapter 2, 2010-12-17, a domain controller (network management server) serves to generate a slice, that is, a virtual network on a physical network. That is, the domain controller receives a slice definition including components of the slice, that is, a node sliver (virtual node), a link sliver (virtual link), and a slice definition including combination information of the node sliver and the link sliver which are included in the slice from a developer of the slice, and distributes the slice definition to a virtualization node (physical network node). Each virtualization node allocates necessary resources to the node sliver and the link sliver according to the slice definition.

(Federation on Distributive Control)

Meanwhile, an example of setting and management method of the interdomain service by the distributive control method is disclosed in Private Network-Network Interface Specification Version 1.0 (PNNI 1.0), af-pnni-0055.000, ATM Forum, March 1996, p. 13 to p. 38. In Private Network-Network Interface Specification Version 1.0 (PNNI 1.0), af-pnni-0055.000, ATM Forum, March 1996, p. 13 to p. 38, a peer group (domain) including a plurality of physical nodes is handled as a representative node by using a private network-network interface (PNNI) to simplify routing information (control information) and configure a network which can be scalably routed (controlled). In Private Network-Network Interface Specification Version 1.0 (PNNI 1.0), af-pnni-0055.000, ATM Forum, March 1996, p. 13 to p. 38, the peer group including a plurality of peer groups is hierarchically configured to implement new scalability.

(Scalability)

In most domains by the centralized management method, since the network management server directly manages contents or the amount of resources as well as the network management server manages only an access authority as in US Patent Application Publication No. 2011/0149968, "Method for Controlling Internet Network", it is necessary to access the resources through the network management server at all times. In order to implement unitary setting and management throughout the other domain in the domain, the network management server needs to distinguish management information of an own domain from management information of the other domain and use different formats in a message within the domain and a message outside the domain. Further, by performing the distinguishment, scalability regarding a manageable network scale is ensured.

This point is similarly applied even to negotiation of control information between control nodes in the distributive control method. For example, on the Internet, in routing in a domain (Autonomous System (AS)), an Interior Gateway Protocol (IGP) such as a Routing Information Protocol (RIP), Open Shortest Path First (OSPF), or the like is used, and in interdomain routing, an Exterior Gateway Protocol (EGP) such as a Border Gateway Protocol (BGP), or the like is used. Further, a PNNI is used even with respect to a peer group of any hierarchy in an ATM, but there is a difference in that a message in the peer group includes database information within the peer group and the message outside the peer group does not include the database information within the peer group. That is, the scalability is ensured by distinguishing and using an IGP and an EGP within and outside the domain in the Internet. Meanwhile, database information regarding network topology, and the like is transmitted to the inside of the peer group in the ATM, but the database information is not transmitted to the outside of the peer group to ensure the scalability. In "Using events for the scalable federation of heterogeneous components" written by J. Bates, J. Bacon, K. Moody, and M. Spiteri, Proceedings of the $8^{th}$ ACM SIGOPS European workshop on Support for composing distributed applications, pp. 58-65, 1998, a network is assumed, in which all of respective domains adopting the EGP use the Internet protocol and further, in Private Network-Network Interface Specification Version 1.0 (PNNI 1.0), af-pnni-0055.000, ATM Forum, March 1996, p. 13 to p. 38, it is assumed that all of the peer groups use the ATM and the PNNI.

(Federation on Event Base)

"Using events for the scalable federation of heterogeneous components" written by J. Bates, J. Bacon, K. Moody, and M. Spiteri, Proceedings of the 8$^{th}$ ACM SIGOPS European workshop on Support for composing distributed applications, pp. 58-65, 1998 discloses a method of performing federation among a plurality of domains by using the event base. In this method, the element (management server) of each domain is the event base and for example, it is assumed that this method is operated according to the API such as event notification, event notification reservation, and the like. In this method, in addition of a federation function, a system federator linking the plurality of domains is added and an operation to be made when the system federator receives event notification as well as the event is reserved to be notified to the system federator when a predetermined event is generated in each domain is described as a rule. This method cannot be applied when each domain does not have an operating mechanism of the event base.

BRIEF SUMMARY OF THE INVENTION

In order to implement the interdomain service by the related art, a mechanism for the interdomain service may be prepared in advance and further, although the mechanism for the interdomain service is not prepared in advance, one type of mechanism has only to be prepared, when all domains accessed are controlled and managed by the same management method or the same control method, and as a result, mounting thereof is comparatively easy. For example, when the distributive control method is to be used, it is assumed that the Internet protocol is used in a current global network, and as a result, the interdomain service can be implemented by the EGP. Even in the PNNI, it is assumed that the same control method is used in all of the peer groups. However, in the future, when a network based on a new-generation protocol is used and the interdomain service taking different control and management methods is required, this method cannot be taken.

First, in order to implement a service among a wide variety of domains by using the related art, a function to perform different processings for each protocol in a domain as an access counterpart or each management method needs to be mounted on all network management servers (alternatively, servers for interdomain management) or control nodes on a network boundary (alternatively, in a server for interdomain management, a function to perform different processings for each protocol in each managed domain or each management method needs to be mounted).

A processing function of each access counterpart (managed domain) has the following objects. (1) The management server or control node needs to be modified in order to mount the function on the existing management server or control node, and cost is increased, and a bug is generated by the modification to cause a situation such as a network failure, and the like. (2) When one management server or control node accesses a variety of domains, a variety of interface functions need to be mounted on the management server or control node. As a result, each management server or control node is complicated and there is a risk that a processing load is increased.

Second, in order to implement the service among a wide variety of domains by using the related art, when one server or node accesses a plurality of heterogeneous domains, information that extends among a plurality of domains including an own domain, for example, information on negotiation between the own domain and the other domain or information on a virtual or real network link that extends among the domains also needs to be handled. Setting and management information that extends among the plurality of domains cannot be handled while the network management server designed and installed to manage only the own domain is not modified. Therefore, the management server or control node needs to be modified and the resulting cost increase or risk of the bug generation needs to be shouldered.

It is an object to be addressed in the present invention to establish setting and management for a network service that extends among domains from an own domain in addition to the other domain.

According to an aspect of the present invention, there is provided a method for managing a network system including a first network domain, a second network domain, and a federation system configured to perform setting of a node that belongs to the second network domain by receiving domain setting management information regarding the second network domain from the outside of the second network domain, in which the first network domain includes a plurality of nodes, a pseudo node and a gatekeeper for federation with the second network domain, and a first management node managing the plurality of nodes and the pseudo nodes, the first management node receives first domain setting management information including node setting information of the plurality of nodes from a console connected to the first network domain and transmits the first domain setting management information to the plurality of nodes, each of the plurality of nodes is set depending on the node setting information included in the first domain setting management information, herein, the first domain setting management information includes second node setting information regarding the pseudo node, the second node setting information includes identification information of the pseudo node, and the second node setting information includes second domain setting management information regarding the second network domain, the first management node transmits the first domain setting management information to the pseudo node, the pseudo node transmits the second node setting information to the gatekeeper and the gatekeeper transmits information other than the identification information of the pseudo node from the second node setting information to the federation system, and the federation system performs setting of a node that belongs to the second network domain by using the second domain setting management information.

A slice for a network service that extends among domains may be set from an own domain side.

BRIEF DESCRIPTION OF THE DRAWINGS

FIGS. 9A, 9B, 9C, and 9D are correspondence tables illustrating a correspondence of a recipient address of a packet header between an in-domain and an interdomain;

FIG. 10 is a diagram illustrating expression by an XML of slice information 501;

FIGS. 14A, 14B, 14C, 14D, 14E, 14F, 14G, and 14H are diagrams illustrating contents of a link setting request and a link setting reply between the gatekeeper and the real node;

FIG. 15A is a diagram illustrating a content of a path setting request between the gatekeeper and the gateway;

FIG. 15B is a diagram illustrating a content of a path setting reply between the gatekeeper and the gateway;

FIG. 15C is a diagram illustrating a content of an interdomain path setting request between the gatekeeper and the gateway;

FIG. 15D is a diagram illustrating a content of an interdomain path setting reply between the gatekeeper and the gateway;

DETAILED DESCRIPTION OF THE INVENTION

Hereinafter, embodiments of the present invention will be described with reference to the accompanying drawings.

(First Embodiment)

(Network Configuration)

Figure 1:
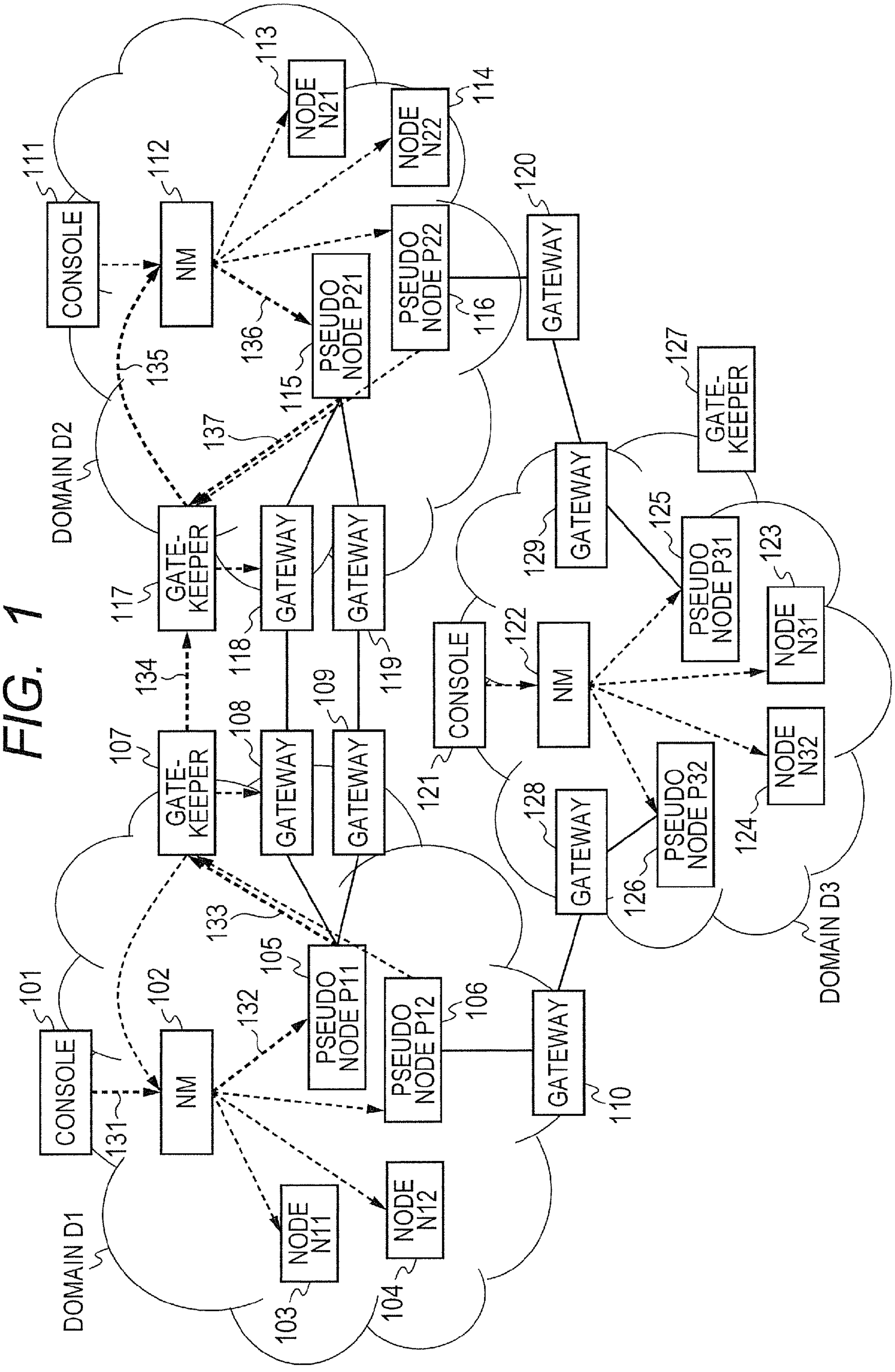
FIG. 1 is an overall configuration diagram of a network including domains D1, D2, and D3 in an embodiment.

A first embodiment will be described. FIG. 1 illustrates an overall configuration of a network including domains D1, D2, and D3. The domain D1 includes an operator console 101 used for an operator to input various control data or control commands and further display data, and the like, a network management server (NM) 102 (control management node, also referred to as a management node) configured to distribute data or control information to a network node or process data collected from the network node in order to manage the network, a gatekeeper (GK) 107 including network nodes 103 and 104 and further, communicating with the other domain for interdomain federation, a pseudo node (P11) 105 for federation with the domain D2, a gateway 108, a pseudo node (P12) 106 for federation with the domain D3, and a gateway 110. When the number of paths to the domain D2 is two, the domain D1 also includes gateways 109 corresponding to the paths.

Further, the domain D2 includes an operator console 111, a network management server (NM) 112, and network nodes 113 and 114 and further, includes a gatekeeper (GK) 117 for interdomain federation, in particular, a pseudo node 115 for federation with the domain D1, a gateway 118, a pseudo node 116 for federation with the domain D3, and a gateway 120. When the number of paths to the domain D1 is two, the domain D2 also includes gateways 119 corresponding to the paths.

The gatekeeper 107 and the gateway 108 are interface parts for interdomain federation and may be together called a 'federation system' of the domain D1. Further, the gatekeeper 117 and the gateway 118 may be together called a 'federation system' of the domain D2.

In addition, herein, the domain D1 and the domain D2 have the same configuration, but when an interdomain interface is the same, the structure of any one domain may be different from that of the other domain. For example, in the domain D2, the network management server 112 has an interdomain federation mechanism therein and may transmit and receive messages among domains without using the pseudo node 115 or the gatekeeper 117.

Herein, the control management node is a network management server or control node not modified for interdomain federation, which handles only the setting management information of the own domain. The control and management information is transmitted to the node in the own domain by a predetermined control management protocol.

The pseudo node is a node (server) that receives management information of the other domain from the network management server as a format of the setting management information of the node and transmits information of the other domain to the gatekeeper. The control management information is received from the control management node by the predetermined control management protocol.

The gatekeeper is a server that converts the management information received from the pseudo node of the own domain into a standard format and transmits the converted information to other domain by a predetermined federation protocol and converts the management information of the standard format received from other domain by the predetermined federation protocol into a format in the own domain and transmits the converted information to the control management node of the own domain. The gatekeeper serves to set the gateway through an interface API of the gateway.

The gateway is a gateway that converts a data packet from the own domain into a standard format and transmits the converted data packet to other domain and converts the data packet of the standard format from other domain into the format of the own domain and transmits the converted data packet. The gateway may serve as an end point of an interdomain virtual or real data transmission path and further, may serve as an end point of a virtual or real data transmission path from the inside of the domain. The gatekeeper has an interface API for setting the paths. The gatekeeper may connect the virtual or real data transmission paths among the domains and the virtual or real data transmission paths in the domain to each other and relay packets.

As such, since the domain D1 may be federated with the plurality of domains, the plurality of pseudo nodes 105 and 106 is provided, but one gatekeeper may be federated with the plurality of domains. One pseudo node may be federated with the plurality of domains. Further, as described above, the plurality of gateways is provided for federation with the plurality of domains in the domain D1, but one gateway may be federated with the plurality of domains. Further, the network management server may select and use one of the plurality of gateways with the plurality of gateways provided between two domains and further, when a route is automatically selected like dynamic routing, the gateway may be automatically selected.

The domains D1 and D2 are independent from each other and not federated with each other before applying the method of the embodiment. In this state, the pseudo nodes 105 and 115, the gatekeepers 107 and 117, and the gateways 108 and 118 are not provided. Physical nodes may be added to the domains D1 and D2, respectively and in this case, information on the added physical nodes is stored in the NM 102 and the NM 112. Therefore, the NM 102 and the NM 112 may perform setting to the added physical nodes. The pseudo nodes 105 and 115 may be added in the completely same method as the addition of the physical nodes. That is, information on the pseudo nodes 105 and 115 is added to the NM 102 and the NM 112 as physical node information. Therefore, interdomain federation may be performed as described below.

(Node Configuration)

Figure 11C:
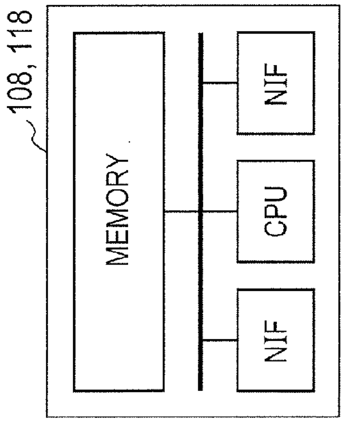
FIG. 11C is a diagram illustrating a configuration of a gateway.
Figure 11B:
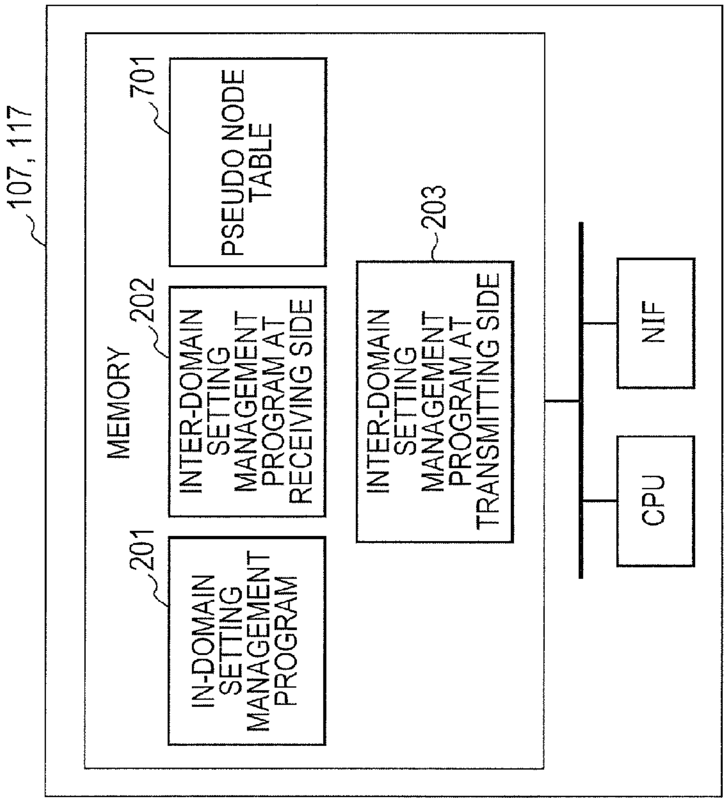
FIG. 11B is a diagram illustrating a configuration of a gatekeeper.
Figure 11A:
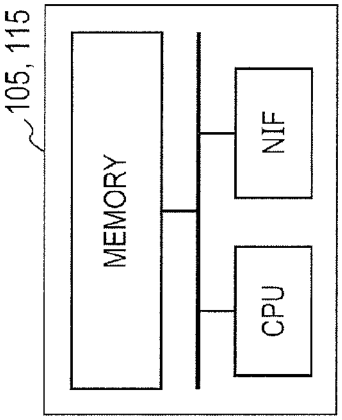
FIG. 11A is a diagram illustrating a configuration of a pseudo node.

FIG. 11 illustrates configurations of the pseudo nodes 105 and 115, the gatekeepers 107 and 117, and the gateways 108 and 118. FIG. 11A illustrates the pseudo nodes 105 and 115. The pseudo nodes 105 and 115 have CPUs, memories, and network interfaces (NIFs) therein and may communicate with the NM 102, the NM 112, the gatekeeper 107, the gatekeeper 117, and the like through the NIF.

The gatekeepers 107 and 117 have the CPUs, the memories, and the network interfaces (NIFs) as illustrated in FIG. 11B and may communicate with the pseudo nodes 105 and 115, the gateways 108 and 118, and the like through the NIF. The memories of the gatekeepers 107 and 117 include programs such as an in-domain setting management program 201, a receiving-side interdomain setting management program 202, a transmitting-side interdomain setting management program 203, and the like or data such as a pseudo node table 701, and the like. The programs 201, 202, and 203, in particular, steps 301, 303, 401, and 403 include processing newly required in the embodiment, in addition to the interdomain negotiation functions and the gateway setting functions of the gatekeepers 107 and 117 in the related art. Further, the data 701 is data newly required in the embodiment.

The gateways 108 and 118 have the CPUs, the memories, and two network interfaces (NIFs) therein as illustrated in FIG. 11C, and may communicate with the server or node in the domain by one NIF and communicate with the gateway of the other domain (that is, the gateway 118 in association with the gateway 108 and the gateway 108 in association with the gateway 118) by the other NIF. The gatekeeper 107 and the gatekeeper 117 may communicate with each other through the gateways 108 and 118 and communicate with each other through not the gateways 108 and 118 but other routes. The function of each device is implemented by processing the data or program in the memory with the CPU and further, the pseudo nodes, the gatekeepers, and the gateways communicate with the outside through the network interface (NIF).

(Management Information)

Figure 5:
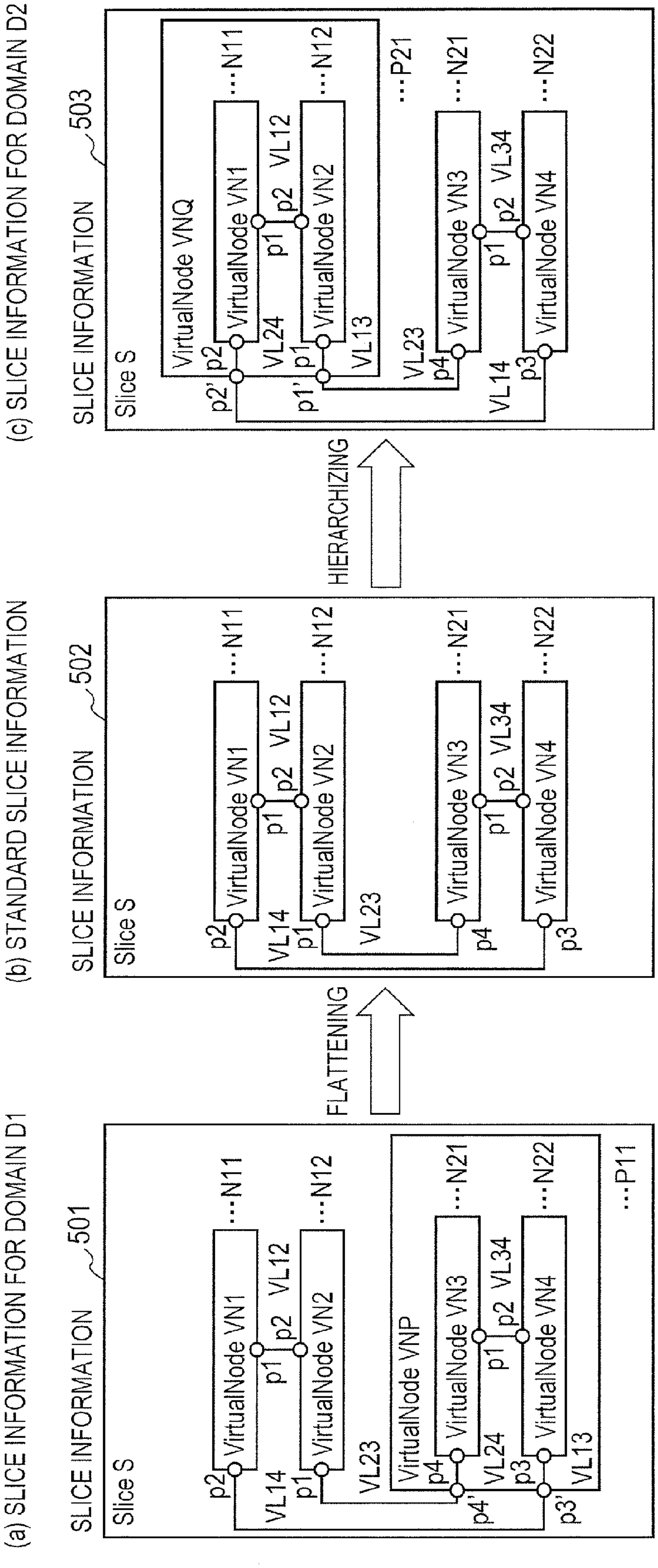
FIG. 5 is an explanatory diagram of a content of management information (slice information) in an embodiment.

FIG. 5 illustrates a content of management information. In the embodiment, management information of a virtual network or a physical network is called slice information.

The reason is that the same configuration information of the slice (virtual network) as "Development Method and Experience of A Non-IP Protocol Using the Virtualization Nodes" written by Kanada, Yasusi and Nakao, Akihiro, IEICE Technical Committee on Internet Architecture, Phrases 3.2, 4.1, and 4.2 of Chapter 2, 2010-12-17 is assumed as the management information. However, a content of the slice information is not limited to the virtual network but may include information of the real network.

(Real Network and Slice)

Figure 13:
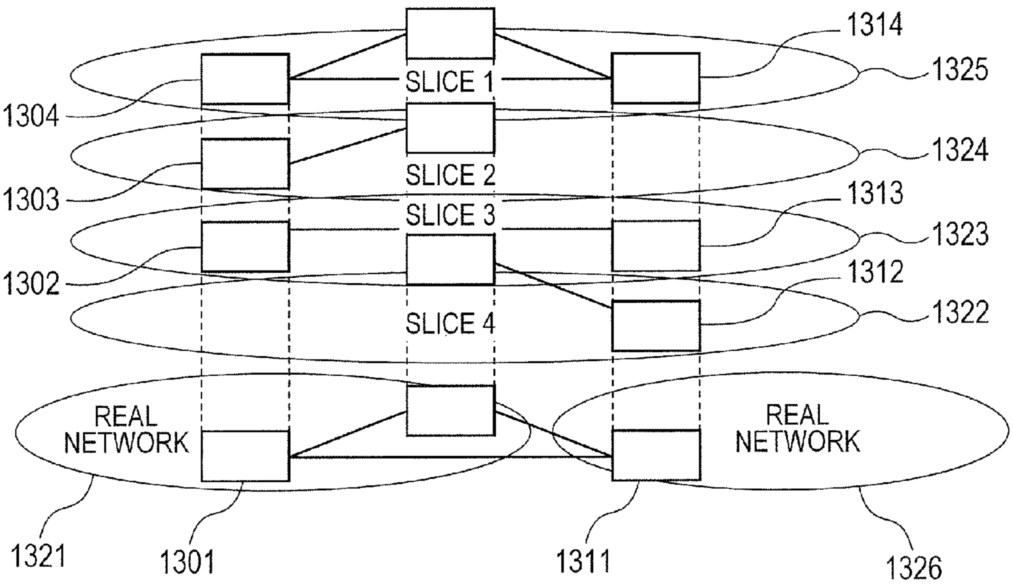
FIG. 13 is a diagram illustrating the relationship between a real network and a virtual network (slice)

Hereinafter, in the case where the management information handles the virtual network, the relationship between the real network and the virtual network, that is, the slice will be described with reference to FIG. 13. A physical node 1301 is provided on a real network 1321 and a physical node 1311 is provided above a real network 1326. Slices 1322, 1323, 1324, and 1325 are generated on the physical networks 1321 and 1326. Virtual nodes 1302, 1303, and 1304 are generated on the physical node 1301 and virtual nodes 1312, 1313, and 1314 are generated on the physical node 1311. The virtual nodes 1304 and 1314 belong to the slice 1325 and are combined with each other by a virtual link. The virtual nodes 1302 and 1312 belong to the slice 1323 and are combined with each other by the virtual link. The virtual links extend among the domains. The structure of the slice may have the same as that of the real network, but since the virtual link may be generated without being limited to a physical link by using a tunnel, and the like, the slice may have a different structure from the real network.

(Slice and Slice Information)

The slice is generally constituted by a plurality of virtual nodes and virtual links (virtual data transmission paths) connecting the virtual nodes to each other. The virtual nodes are formed on the physical nodes, but connection of the virtual nodes is independent from connection of the physical nodes. That is, the virtual link is not bound by a real link. The virtual node has network protocol processing functions including switching and routing, but the functions may be independent from a protocol processing function of the physical node including the virtual node.

In order to set the virtual network that extends among the domains, the configuration information of the slice constituted by a list of the virtual nodes and a list of the virtual links is included in a management message as the slice information (also called 'management information' or 'setting management information') in the embodiment.

The slice information is information including an attribute or a resource amount of the virtual node on the virtual network, for example, the number of CPUs or a memory amount corresponding to the virtual node or an attribute of the virtual link, for example, a band which the virtual link can use, a connection relationship between the virtual node and the virtual link, and the like. However, the slice information need not include information on all virtual nodes or virtual links included in the slice.

Further, the slice information may not particularly be information on the virtual network. That is, the slice information may be information for managing the physical node or the physical link (real data transmission path). In this case, the slice information may include setting information or information regarding a state of the physical node, information (for example, usability or a traffic volume) regarding a state of the physical link, or the like.

In the PNNI, the IGP, or the EGP of the background art, the slice information included the routing information. However, in the embodiment, it is assumed that the slice information primarily includes the configuration information of the virtual network, that is, information regarding the structure of the virtual network and the routing information is additionally given by a developer of the virtual network. However, the slice information may include the routing information.

(Content of Slice Information)

Subsequently, the content of the slice information will be described with reference to FIGS. 5A to 5C and FIG. 20D.

FIG. 5A illustrates slice information for the domain D1. Slice information 501 regarding the slice S (virtual network or physical network) includes a virtual node VN1 having ports p1 and p2, a virtual node VN2 having the ports p1 and p2, a virtual node VNP having ports p3' and p4', a virtual link VL12 connecting the port p1 of the VN1 and the port p2 of the VN2, a virtual link VL14 connecting the port p2 of the VN1 and the port p3' of the VNP, and a virtual link VL23 connecting the port p1 of the VN2 and the port p4' of the VNP. The virtual node VN1 corresponds to the physical node N11 (that is, is generated in the N11) and the virtual node VN2 corresponds to the physical node N12 (that is, is generated in the N12). Further, the virtual node VNP corresponds to the pseudo node P11. In addition, the virtual node VNP includes a virtual node VN3 having ports p1 and p4 therein, a virtual node VN4 having ports p2 and p3, and a virtual link VL34 connecting the port p1 of the VN3 and the ports p2 of the VN4 as a nesting, and the port P4 of the VN3 is connected with the port p4' of the VNP by the virtual link VL24 and the port p3 of the VN4 is connected with the port p3' of the VNP by the virtual link VL13. The virtual node VN3 corresponds to the physical node N21 and the virtual node VN4 corresponds to the physical node N22. In other words, when the setting management information that extends among the domains is given to the control management node of the own domain, in the case of the setting management information, information of the own domain having a nesting (nest) format is organized as the unit of the network node and information of the other domain is organized as a format of information to one network node, and an identifier of the pseudo node called P11 that takes the place of (represents) the domain D2 in the domain D1 is added.

FIG. 5B illustrates standard slice information. When the slice information is transferred from the domain D1 to the domain D2, the slice information has a format of 502 at an intermediate point (slice information transferred from the domain D1 to the domain D2 and called standard slice information in that the slice information does not depend on the domain). That is, slice information 502 regarding the slice S includes a virtual node VN1 having ports p1 and p2, a virtual node VN2 having the ports p1 and p2, a virtual node VN3 having ports p1 and p4, a virtual node VN4 having ports p3 and p2, a virtual link VL12 connecting the port p1 of the VN1 and the port p2 of the VN2, a virtual link VL34 connecting the port p1 of the VN3 and the port p2 of the VN4, a virtual link VL14 connecting the port p2 of the VN1 and the port p3 of the VN4, and a virtual link VL23 connecting the port p1 of the VN2 and the port p4 of the VN3. The slice information 502 is acquired by converting the slice information 501. This conversion means that information of the other domain organized in the format of the information to one network node is separated into individual information and the identifier of the pseudo node called P11 having no meaning outside the domain D1 is deleted. The virtual node VN1 corresponds to the physical node N11 (that is, is generated in the N11) and the virtual node VN2 corresponds to the physical node N12 (that is, is generated in the N12). Further, the virtual node VN3 corresponds to the physical node N21 and the virtual node VN4 corresponds to the physical node N22.

Figure 20:
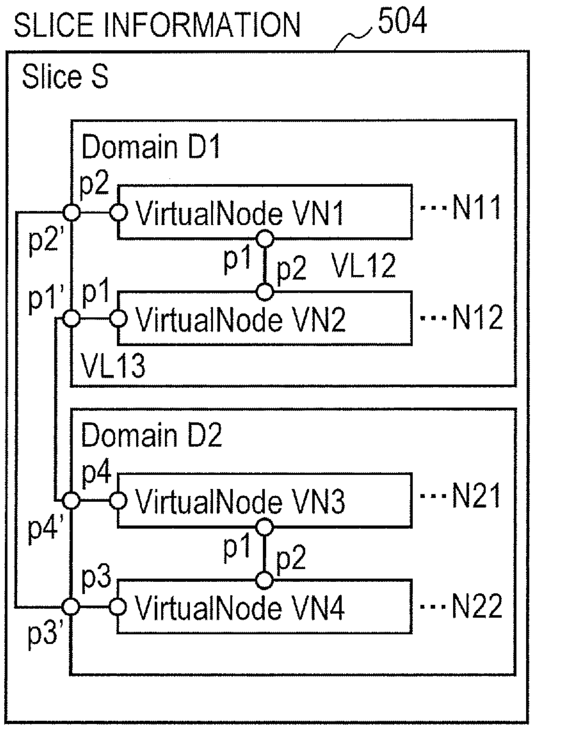
FIG. 20 is a diagram which is continued from the description of FIG. 5.

In addition, as the format of the slice information at the intermediate point between the domain D1 and the domain D2, the slice information may also have a format of 504 of FIG. 20. That is, unlike the slice information 502, in slice information 504 regarding the slice S, respective virtual nodes are bound for each domain. The virtual nodes VN1 and VN2 are provided in the physical nodes N11 and N12 of the domain D1 and thus are bound by the domain D1. Further, the virtual nodes VN3 and VN4 are provided in the physical nodes N21 and N22 of the domain D2 and thus are bound by the domain D2. By taking this format, the gatekeeper need not know a correspondence relationship between the physical node and the domain in the other domain and further, it is advantageous that a processing load of selecting only a physical node that belongs to the own domain among the physical nodes is removed. Further, since a content bound by the domain may be transmitted between the gatekeepers with being encoded, the slice information is suitable for encoding and decoding to be described below.

FIG. 5C illustrates slice information for the domain D2. The slice information takes a format of 503 in the domain D2. That is, slice information 503 regarding the slice S includes a virtual node VN3 having ports p1 and p4, a virtual node VN4 having the ports p3 and p2, a virtual node VNQ having ports p1' and p2', a virtual link VL34 connecting the port p1 of the VN3 and the port p2 of the VN4, a virtual link VL23 connecting the port p4 of the VN3 and the port p1' of the VNQ, and a virtual link VL14 connecting the port p3 of the VN4 and the port p2' of the VNQ. The virtual node VN3 corresponds to the physical node N21 (that is, is generated in the N21) and the virtual node VN4 corresponds to the physical node N22 (that is, is generated in the N22). Further, the virtual node VNQ corresponds to the pseudo node P21. In addition, the virtual node VNQ includes a virtual node VN1 having ports p1 and p2 therein, a virtual node VN2 having ports p1 and p2 , and a virtual link VL12 connecting the port p1 of the VN1 and the ports p2 of the VN2 as a nesting, and the port p2 of the VN1 is connected with the port p2' of the VNQ by the virtual link VL24 and the port p1 of the VN2 is connected with the port p1' of the VNQ by the virtual link VL13. The virtual links VL24 and VL13 in the slice information 503 and the virtual links VL24 and VL13 in the slice information 501 accidently have the same names, but are different virtual links. The virtual node VN1 corresponds to the physical node N11 and the virtual node VN2 corresponds to the physical node N12.

The slice information may be expressed by various methods, but the slice information 501 may be expressed by using an XML as illustrated in FIG. 10.

(Sequence)

(Main Sequence)

Figure 2:
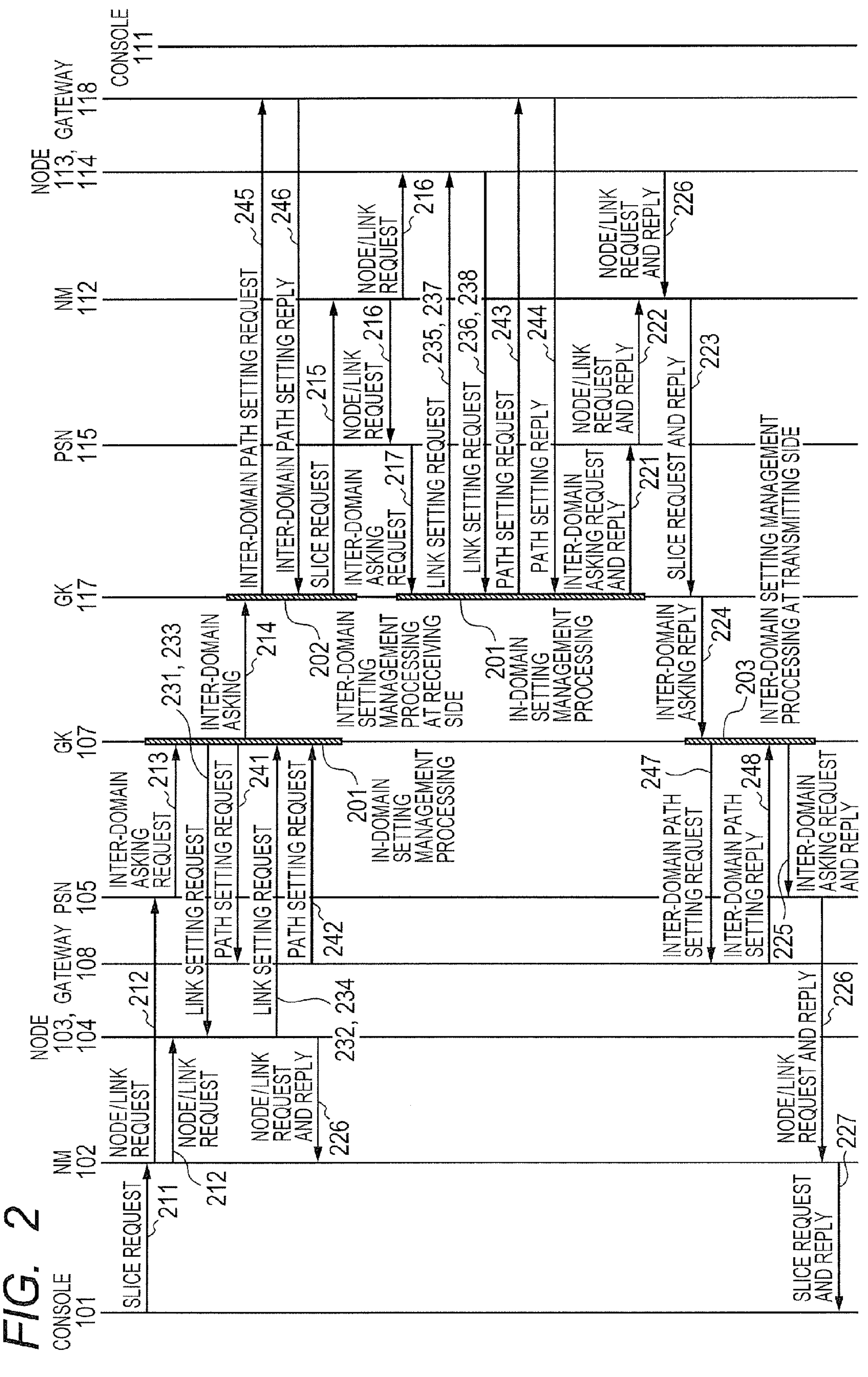
FIG. 2 is a sequence diagram when setting and management operations which extend among the domains D1 and D2 are performed.

FIG. 2 illustrates a sequence when the setting and management operations which extend among the domains D1 and D2 are performed. In FIG. 2, a slice request 211, a node/link request 212, an interdomain asking request 213, an interdomain asking 214, a slice request 215, a node/link request 216, and an interdomain asking request 217 are all one kind of management messages, and take a format of a management message 1201 of FIG. 12A. The management message 1201 is constituted by a classification 1202, slice information 1203, and additional information 1204. The classification 1202 represents a classification (slice request, node/link request, and the like) of the management message 1201.

When the control management node, the pseudo node, the gatekeeper, and the gateway are prepared in the own domain and the other domain, they operate as follows. The aforementioned setting management information is distributed to the pseudo node of the own domain by a predetermined control management protocol and the pseudo node of the own domain transmits the distributed setting management information to the gatekeeper of the own domain. The gatekeeper of the own domain converts the setting management information into a standard format and transmits the corresponding standard format of information to the gatekeeper of the other domain by using the federation protocol, and sets and manages the virtual or real data transmission path from another node of the own domain terminated at the gateway of the own domain.

Further, when the gatekeeper of the own domain receives the standard format of setting management information from the gatekeeper of the other domain by using the federation protocol, the gatekeeper of the own domain transmits the received standard format of setting management information to the gateway of the own domain, and sets and manages the virtual or real data transmission path from the other domain terminated at the gateway of the own domain. In addition, the gatekeeper of the own domain converts the received standard format of setting management information into the format of the own domain and transmits the own domain format of setting management information to the control management node of the own domain.

Further, when the gatekeeper of the own domain receives a success reply of setting and management from the gatekeeper of the other domain by using the federation protocol, the gatekeeper of the own domain sets and manages the virtual or real data transmission path from the other domain terminated at the gateway of the own domain.

Herein, the setting management information takes a nest format. The own domain format of setting management information is distributed to the pseudo node of the own domain and the pseudo node of the own domain transmits the own domain format of setting management information to the gatekeeper of the own domain. The gatekeeper of the own domain identifies that the own domain format of setting management information is the same as the setting management information received in the standard format, and does not perform transmission processing.

Further, in the case of federation with the plurality of domains, the sequence is as follows.

When a plurality of domains is provided except for the own domain, pseudo nodes corresponding thereto are provided, but when the standard format of setting management information is received, in the setting management information after conversion, names of the pseudo nodes that organize information of other domains are set as names of pseudo nodes corresponding to domains of transmitting sources of the setting management information.

Further, when a plurality of counterpart domains is present, different pseudo nodes among the means are used in the respective counterpart domains. The gatekeeper may use different pseudo nodes in the respective counterpart domains and further, one gatekeeper may correspond to the plurality of counterpart domains. One gateway may be used with respect to the plurality of counterpart domains and one gateway may be used for each counterpart domain. Further, the plurality of gateways may be used with respect to one counterpart domain.

By the above configuration, since setting, control, and management for the network service that extends among the domains may be implemented only by adding an additional server or node without modifying the network management server or the control node, the configuration of the network may be simplified and cost by the modification of the control management node or a risk of generation of a bug may be avoided. Further, second, even when the domains based on N types of protocols or management methods are federated with each other, since a server or node having only N types of management functions or control functions that perform conversion between each protocol or each management method and a standard intermediate format may be prepared, scalable federation may be implemented.

Further, from a different angle, the following operation is performed. There is summarized that in a method for managing a network system including a first network domain, a second network domain, and a federation system configured to perform setting of a node that belongs to the second network domain by receiving domain setting management information regarding the second network domain from the outside of the second network domain, the first network domain includes a plurality of nodes, a pseudo node and a gatekeeper for federation with the second network domain, and a first management node managing the plurality of nodes and the pseudo nodes, the first management node receives first domain setting management information including node setting information of the plurality of nodes from a console connected to the first network domain and transmits the first domain setting management information to the plurality of nodes, each of the plurality of nodes is set depending on the node setting information included in the first domain setting management information, herein, the first domain setting management information includes second node setting information regarding the pseudo node, the second node setting information includes identification information of the pseudo node, and the second node setting information includes second domain setting management information, the first management node transmits the first domain setting management information to the pseudo node, the pseudo node transmits the second node setting information to the gatekeeper and the gatekeeper transmits information other than the identification information of the pseudo node from the second node setting information to the federation system, and the federation system performs setting of a node that belongs to the second network domain by using the second domain setting management information.

Hereinafter, a sequence will be described in detail with reference to FIG. 2. In the sequence of FIG. 2, first, the slice request 211 is transmitted from the console 101 to the network management server (NM) 102. The slice request 211 includes the slice information 501 of the format in the domain D1. The NM 102 receives the slice information 501 as the management information of the own domain D1, and puts the received the slice information 501 into the node/link request 212 and distributes the put information to each node under management of the NM 102 including the pseudo node 105 (another option regarding the distribution method of the slice information 501 will be described below).

In FIG. 2, the pseudo node 105, the node N11 103, and the node N12 104 receive the node/link request 212. The node/link request 212 received by the pseudo node 105 is the same as the node/link request 212 received by the node N11 103 and the node N12 104. That is, the pseudo node 105 is added to the domain D1 and a processing method of the NM 102 need not be changed in federation with the domain D2. Accordingly, software and hardware of the NM 102 need not be absolutely changed. Further, software and hardware of the node N11 103 and the node N12 104 need not be absolutely changed. In addition, when the pseudo node 105 receives the node/link request 212, the slice information 501 is put into the interdomain asking request 213 and transmitted to the gatekeeper 107.

The gatekeeper 107 of the domain D1 inputs the slice information 501 of the format in the domain D1 and executes the in-domain setting management program 201 to be described below to acquire the standard format of slice information 502 as a result thereof (without dependency on the domain), and put the acquired slice information 502 into the interdomain asking 214 and transmit the put interdomain asking 214 to the gatekeeper 117 of the other domain. Link setting requests 231 and 233 are transmitted from the gatekeeper 107 to the node N11 103 and the node N12 104 which are start points of interdomain links, respectively while the in-domain setting management program 201 is executed, and link setting replies 232 and 234 which are replies to the link setting requests 231 and 233 are received by the gatekeeper 107. A part in the domain D1 of the virtual link between the node N11 103 and the node N12 104, and the gateway 108 is set by the link setting requests 231 and 233 and the link setting replies 232 and 234. Further, a path setting request 241 is transmitted from the gatekeeper 107 to the gateway 108 while the in-domain setting management program 201 is executed, and a path setting reply 242 is received from the gateway 108.

The gatekeeper 117 of the other domain inputs the standard format of slice information 502 and executes the receiving-side interdomain setting management program 202 to be described below to acquire the slice information 503 of the format in the domain D2 which is a result thereof, put the acquired slice information 503 into the slice request 215 and transmit the put slice request 215 with the slice information 503 to the network management server (NM) 112. An interdomain path setting request 245 is transmitted from the gatekeeper 117 to the gateway 118 while the receiving-side interdomain setting management program 202 is executed, and an interdomain path setting reply 246 is received from the gateway 118.

The NM 112 receives the slice information 503 as the management information of the domain D2, and puts the received the slice information 503 into the node/link request 216 and distributes the put information to each node under management of the NM 112 including the pseudo node 115 (another option regarding the distribution method of the slice information 503 will be described below). When the pseudo node 115 receives the node/link request 216, the slice information 503 is put into the interdomain asking request 217 and transmitted to the gatekeeper 117.

The gatekeeper 117 inputs the slice information 503 of the format in the domain D2 and executes the in-domain setting management program 201, but as a result, since it is known that the slice information need not be transmitted to the domain D1, the slice information is not transmitted and an interdomain asking request replay 221 which is a reply to the interdomain asking request 217 is returned to the pseudo node 115. Link setting requests 235 and 237 are transmitted from the gatekeeper 117 to the node N21 113 and the node N22 114 which are start points of the interdomain links, respectively while the in-domain setting management program 201 is executed, and link setting replies 236 and 238 which are replies to the link setting requests 235 and 237 are received by the gatekeeper 117. A part in the domain D2 of the virtual link between the node N21 113 and the node N22 114, and the gateway 118 is set by the link setting requests 235 and 237 and the link setting replies 236 and 238. Further, a path setting request 243 is transmitted from the gatekeeper 117 to the gateway 118 while the in-domain setting management program 201 is executed, and a path setting reply 244 is received from the gateway 118.

The pseudo node 115 that receives the interdomain asking request reply 221 returns a node/link request reply 222 which is a reply to the node/link request 216 to the NM 112. The NM 112 that receives the reply returns a slice request reply 223 which is a reply to the slice request 215 to the gatekeeper 117. The gatekeeper 117 that receives the reply returns an interdomain request reply 224 which is a reply to the interdomain asking 214 to the gatekeeper 107.

The gatekeeper 107 that receives the interdomain asking reply 224 executes the transmitting-side interdomain setting management program 203 and returns an interdomain asking request reply 225 which is a reply to the interdomain asking request 213 to the pseudo node 105. An interdomain path setting request 247 is transmitted from the gatekeeper 117 to the gateway 118 while the transmitting-side interdomain setting management program 203 is executed, and an interdomain path setting reply 248 is received from the gateway 118.

The pseudo node 205 that receives the interdomain asking request reply 225 returns a node/link request reply 226 which is a reply to the node/link request 212 to the NM 102. The NM 102 that receives the reply returns a slice request reply 227 which is a reply to the slice request 211 to the console 101.

(Sequence Complementation)

Hereinafter, the sequence will be complementarily described. The sequence of FIG. 2 is the sequence that performs management from the domain D1 to the domain D2, but an opposite sequence also has the same pattern. That is, FIG. 2 illustrates the sequence when the slice request 211 including the slice information 501 is input from the console 101 of the domain D1 side, but the sequence when the slice request including the slice information 503 is input from the console 111 of the domain D2 side becomes a sequence acquired by exchanging the console 101 and the console 111, exchanging the NM 102 and the NM 112, exchanging the physical nodes 103 and 104 and the physical nodes 113 and 114, exchanging the gateway 108 and the gateway 118, exchanging the pseudo node 105 and the pseudo node 115, and exchanging the gatekeeper 107 and the gatekeeper 117 in FIG. 2.

Further, when the domain D2 is mounted with the same interface API between the gatekeeper 107 and the gatekeeper 117, the sequence in the domain D1 is not changed regardless of the internal sequence of the domain D2. That is, when the domain D2 returns the interdomain asking reply 224 with respect to the interdomain asking 214, the sequence from the slice request 211 to the interdomain asking 214 and from the interdomain asking reply 224 to the slice request reply 227 is not changed.

(Alternative on Distribution Method of Slice Information)

In the above description, when the slice information 501 and 503 is distributed to the nodes, the NM 102 and the NM 112 takes a method of directly distributing the slice information to all of the nodes as it is. However, three alternatives on this method are provided.

(Distribution of Partial Information)

Figure 6:
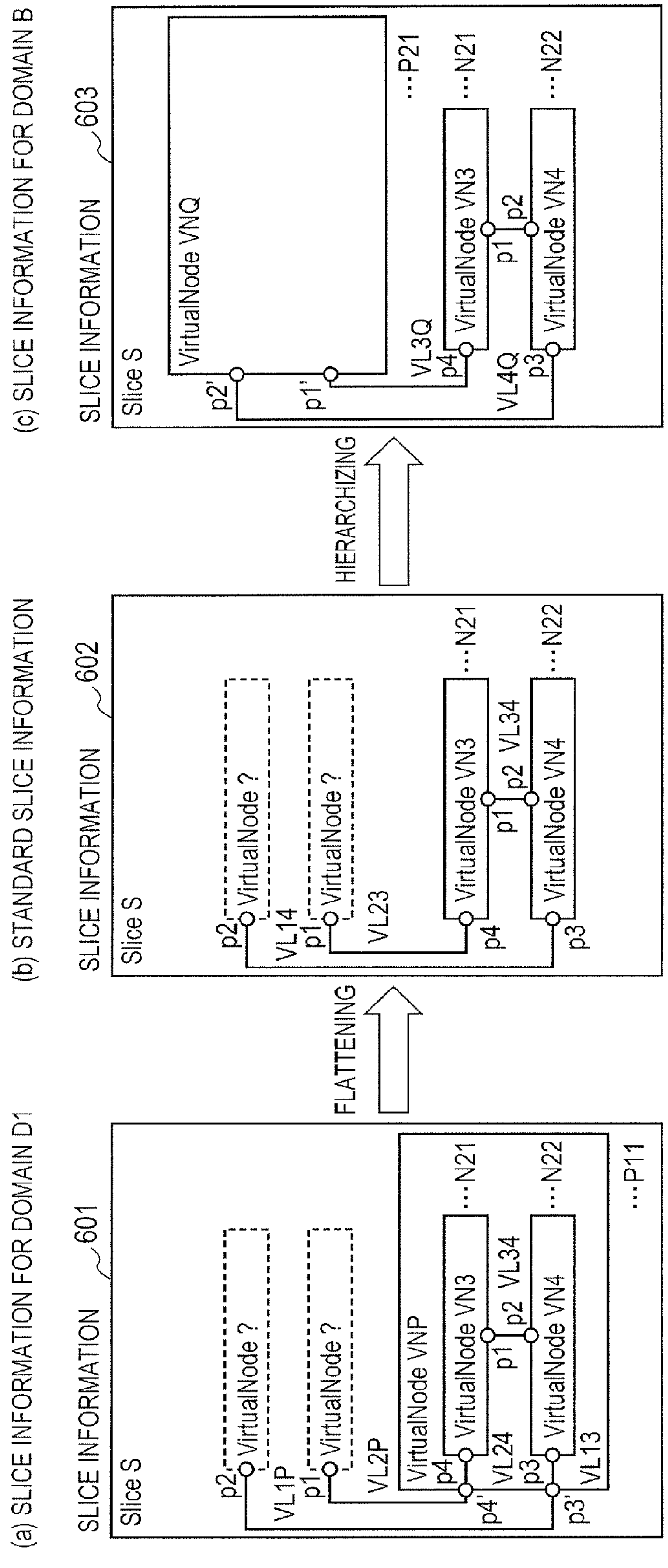
FIG. 6 is an explanatory diagram of a content of management information (slice information) in a complementary description of the embodiment.

A first alternative will be described with reference to FIG. 6. The first alternative is a method of extracting only information on a node of a distribution destination from the slice information 501 and 503 and distributing only information on one node to each node. When this method is selected, the pseudo node 105 receives slice information 601 acquired by removing information on the virtual nodes VN1 and VN2 from the slice information 501. However, information on virtual links from the virtual node VNP to the virtual nodes VN1 and VN2, that is, VL1P and VL2P is required to execute setting corresponding to the virtual links and is included in the slice information 601. When the pseudo node 105 receives the slice information 601, slice information 602 is used instead of the slice information 502. That is, information acquired by removing the information on the virtual nodes VN1 and VN2 from the standard format of slice information is transferred from the domain D1 to the domain D2. Further, the slice information transferred to the NM 112 becomes a form of slice information 603. That is, even in this case, although the information on the virtual nodes VN1 and VN2 is removed, information on virtual links from the virtual node VNQ to the virtual nodes VN3 and VN4, that is, VL3Q and VL4Q is required to execute setting corresponding to the virtual links and included in the slice information 603.

(Distribution by Control Protocol (Routing Protocol, and the Like))

A second alternative is a method in which the NM 102 and the NM 112 distribute the slice information 501 and 503 to only one node and distributively redistribute the slice information among the nodes. The redistribution may be implemented by burying the slice information in the control protocol such as the routing protocol, and the like.

(Encoding Secret Information in Domain)

A third alternative is a method of encoding secret information in the domain, which is included in the slice information. There is a case in which internal information of the own domain intends to be concealed with respect to the other domain, in federation among the plurality of domains. In the embodiment, since the management information of the domain D2 is all transferred in a referable state at the time of transferring the slice information to the domain D1, the concealment may not be performed. However, the following method may be selected in order to conceal the internal content of the own domain. When the slice information 501 is generated, information in the virtual node VNP is encoded and concealed. However, only the link names VL14 and VL23 are not concealed. By this configuration, a correspondence between the virtual link and an installation parameter may be taken, but the configuration in the domain may be concealed.

When the slice information 501 including the encoded information is converted into the slice information 502 in the gatekeeper 108, information on the virtual nodes VN1 and VN2 and the virtual link VL12 therebetween is encoded to conceal the internal information of the domain D1. When the slice information 502 is transferred to the gatekeeper 118 and converted into the slice information 503, information on the virtual nodes VN3 and VN4, and the virtual link VL34 therebetween may be made into a plain sentence by a decoding key possessed by the gatekeeper 118. In the domain D2, setting management may be performed based on even the information. When the slice information 503 is transferred from the gatekeeper 118 to the gatekeeper 108, the information on the virtual nodes VN3 and VN4 and the virtual link VL34 therebetween is encoded by the gatekeeper 118 again, but on the contrary, the information on the virtual nodes VN1 and VN2 and the virtual link VL12 therebetween is decoded by the gatekeeper 108.

Even in regard to slice information that extends among three or more domains, the slice information of the own domain may be encoded when a gatekeeper of the domain transmits the slice information to the outside for each domain and the slice information of the own domain may be decoded when the slice information is received from the outside.

(Packet Header Conversion Method)

(Packet Header Conversion in Gateway (Mapping Between in-Domain Expression and Interdomain Expression))

Subsequently, a packet header conversion method in the gateways 108 and 118 will be described. Packet headers of packets transmitted among the domains may be determined independently in an in-domain mounting method and an interdomain mounting method as described below. As a result, there is a case in which address conversion and protocol conversion are required in this conversion. That is, first, there is a possibility that different protocols will be used in the domains D1 and D2. Further, second, there is a possibility that different protocols will be used in the D1 and D2 in packet transmission between the D1 and the D2. Therefore, protocols of the gateways 108 and 118 need to be converted into each other. That is, a packet header of a data packet needs to be converted.

FIG. 9 illustrates a correspondence table for four types of protocol conversions incorporated in the gateways 108 and 118. The gateways 108 and 118 perform the packet header conversion by referring to the correspondence table thereof, but a conversion program itself is performed by using a header prepared in a storage device in advance. However, it is necessary to designate for each slice which protocol conversion among different types of protocol conversions is used.

First, in conversion from a virtual LAN (VLAN) to the VLAN, a correspondence table 901 between a VLAN identifier (VLAN ID) and a MAC address illustrated in FIG. 9A is used, the VLAN ID and the MAC address among the domains are acquired from the correspondence table 901 by using the VLAN ID and the MAC address in the domain as a key, and the VLAN ID and the MAC address of the packet header may be rewritten.

Second, in conversion from an IP tunnel to the IP tunnel, a correspondence table 902 of the IP addresses illustrated in FIG. 9B is used, and the IP addresses among the domains are acquired from the correspondence table 902 by using the IP addresses in the domain as a key to rewrite the IP address of the packet header.

Third, in conversion from the VLAN to the IP tunnel, a correspondence table 903 of the VLAN ID, the MAC address, and the IP address illustrated in FIG. 9C is used, conversion of an Ethernet (registered trademark) header into the IP header or insertion of the IP address is performed, and the acquired IP address may be written in the acquired IP header.

Fourth, in conversion from the IP tunnel to the VLAN, a correspondence table of the IP address, the VLAN ID, and the MAC address is used by using a correspondence table 904 illustrated in FIG. 9D, and conversion of the IP header into the Ethernet header or deletion of the IP address is performed to write the acquired VLAN ID and MAC address in the Ethernet header.

The correspondence tables may be used bidirectionally from the in-domain to the interdomain and from the interdomain to the in-domain. In the correspondence tables, in the conversion from the in-domain to the interdomain, an address of the gateway in the domain is designated as a conversion source and an address of the gateway between the domains of the other domain is designated as a conversion destination. Further, in the conversion from the interdomain to the in-domain, an address of the gateway between the domains of the own domain is designated as the conversion source and an address in the domain attached to the node of the own domain is designated as the conversion destination. The correspondence tables are set by communications from the gatekeepers 107 and 117 to the gateways 108 and 118 to be described below, that is, the path setting requests 241 and 243 and the interdomain path setting requests 245 and 247, and the packet header is converted when the data packet is transmitted and received among the domains.

(Omission of Packet Header Conversion in Gateway)

In the above method, although the in-domain mounting method and the interdomain mounting method are the same as each other, address conversion is performed by using the correspondence table. However, when the mounting methods are the same as each other, conversion is not required in the case in which the address (and the VLAN ID) is provided. That is, although the gatekeeper 108 transmits the address of the gateway 109 at the time of transferring the address of the interdomain virtual link at the domain D1 side to the gatekeeper 118, instead, when the address (and the VLAN ID) which the gatekeeper 108 receives from the virtual nodes VN1 and the VN2 is transferred to the gatekeeper 118 as it is, conversion in the gateway 109 is not required and the gateway is also not required (however, a link from the outside needs to be directly connected to the inside of the domain).

(Processing of Transmitting-Side (Domain D1) Gatekeeper 1/2)

Figure 3:
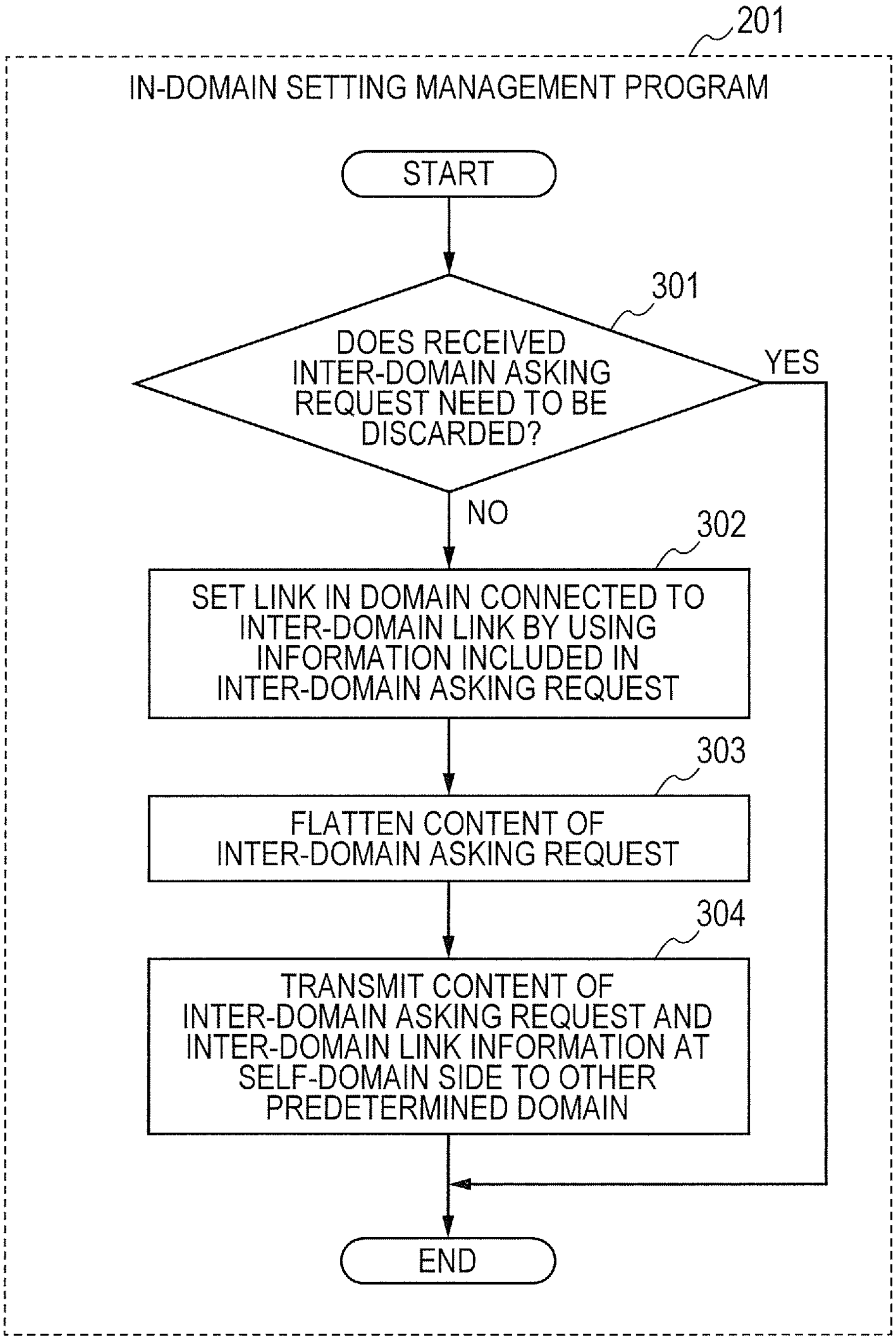
FIG. 3 is a flowchart illustrating a sequence of an in-domain setting management program 201.

FIG. 3 is a flowchart illustrating a processing sequence of the in-domain setting management program 201 in the gatekeepers 107 and 117. When execution of the in-domain setting management program 201 starts, it is first judged whether the received interdomain asking request needs to be discarded in step 301. A detailed method for the judgment will be described below. When a result of the judgment is true, the in-domain setting management program 201 ends, but when the result is false, the process proceeds to step 302.

(In-Domain Setting for Interdomain Virtual Link in Transmitting-Side Gatekeeper)

In step 302, an in-domain link connected to the interdomain link is set by using the information included in the interdomain asking request 213. In detail, in the processing of the slice information 501 in the domain D1, first, paths corresponding to the virtual links VL14 and VL23 are set. In the setting, first, when a gateway through which the interdomain link needs to pass is not yet determined, the gateway is determined. Since the gateway 108 is present as the gateway between the domains D1 and D2, it is determined that the gateway 108 is to be used. When the plurality of gateways is usable, a load may be distributed by selecting a predetermined gateway among the plurality of gateways and further, when a method in which the path is automatically selected such as the IP routing is used, automatic selection may be adopted.

(In-domain Setting by VLAN for Interdomain Virtual Link)

Figures 14A, 14B, 14C, 14D, 14E, 14F, 14G, 14H:
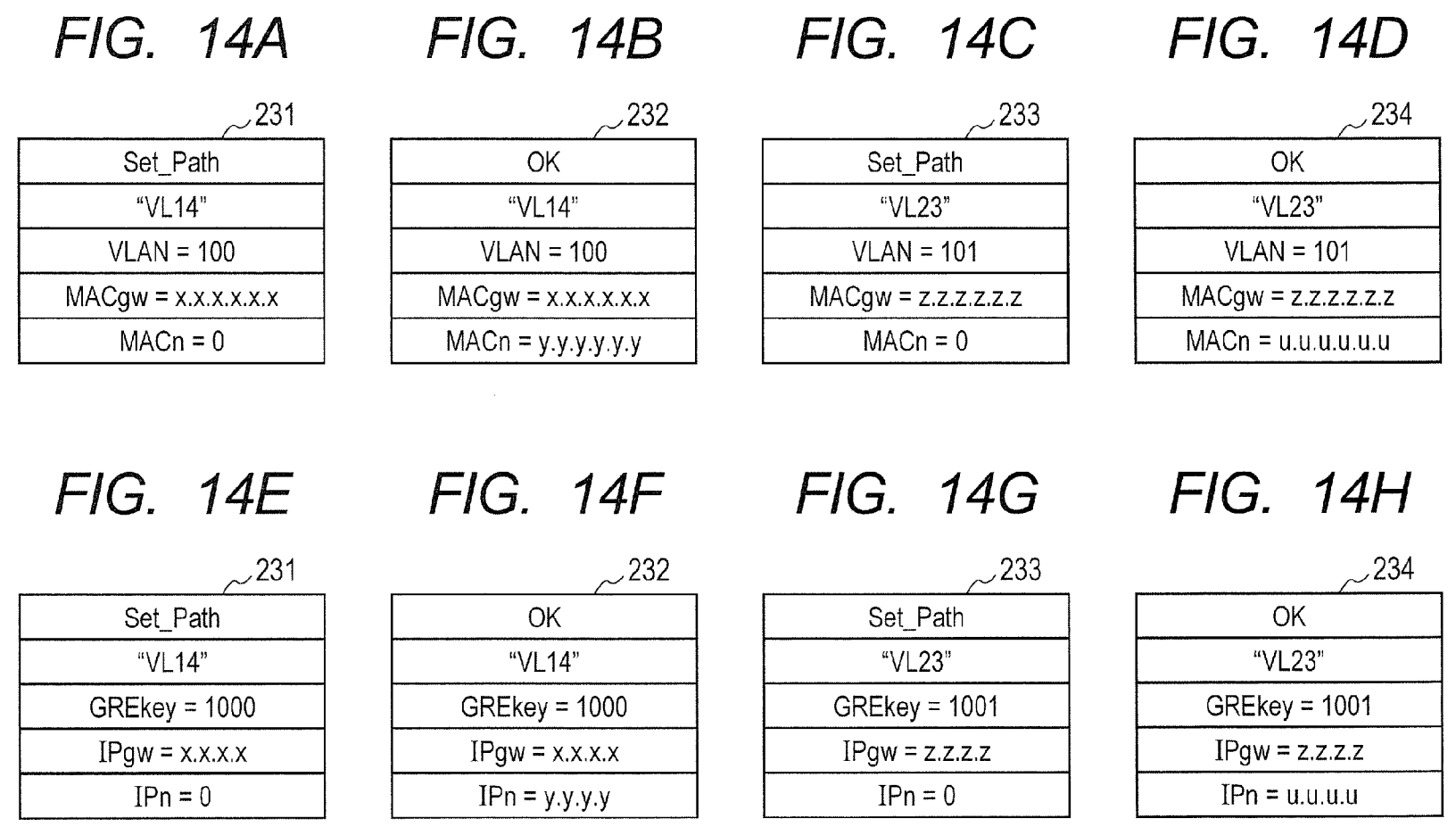

Subsequently, an in-domain part of the virtual link VL14, that is, a part from the virtual node VN1 to the gateway 108 is set. In the setting, among virtual link mounting methods which are usable in the domain D1, the mounting method may be determined independently from the domain D2 and further, independently from an interdomain part of the virtual link VL14. When the VLAN is selected as the mounting method, the VLAN IDs of the port p2 of the virtual node VN1 and the port p3 of the virtual node VNP coincide with each other. To this end, the gatekeeper 107 transmits the link setting request 231 to the real node N11 103 corresponding to the virtual node VN1 in the slice information 501 and negotiates the VLAN ID by receiving the link setting reply 232 from the real node N11 103. When 100 is used as the VLAN ID, the value is designated in the link setting request 231 as illustrated in FIG. 14A. In FIG. 14, since the designated VLAN ID is used as it is in the link setting request 231, the VLAN ID is determined by twice communications, but when the real node N11 103 requests changing the value, three times or more communications are required.

Further, when the packet is transmitted to the port p2 of the VN1 via the virtual link VL14, first setting is performed with respect to the gateway 108 so that the MAC address corresponding to the port p2 is designated as a recipient MAC address in the packet received by the gateway 108 (so that the packet is relayed). On the contrary, when the packet is transmitted to the port p3' of the virtual node VN4 represented by the VNP through the virtual link VL14, the MAC address is notified in communication with the real node N11 103 so that the MAC address corresponding to the port p3 of the virtual node VNP as a relay point is designated as the recipient MAC address in the packet. When the MAC address of the gateway 108 side is x.x.x.x.x.x and the MAC address of the N11 side is y.y.y.y.y.y, the former is designated in the link setting request 231 as illustrated in FIG. 14A and the latter is designated in the link setting reply 232 as illustrated in FIG. 14B.

Further, an in-domain part of the virtual link VL23, that is, a part from the virtual node VN2 to the gateway 108 is set. In the setting, among virtual link mounting methods which are usable in the domain D1, the mounting method may be determined independently from the domain D2 and further, independently from an interdomain part of the virtual link VL23.

When the VLAN is selected as the mounting method, first, the VLAN IDs of the port p1 of the virtual node VN2 and the port p4 of the virtual node VNP coincide with each other. To this end, the gatekeeper 107 transmits the link setting request 233 to the real node N12 104 corresponding to the virtual node VN2 in the slice information 501 and negotiates the VLAN ID by receiving the link setting reply 234 from the real node N12 104. When 101 is used as the VLAN ID, the value is designated in the link setting request 233 as illustrated in FIG. 14C.

Further, when the packet is transmitted to the port p1 of the VN2 via the virtual link VL23, second setting is performed with respect to the gateway 108 so that the MAC address corresponding to the port p1 is designated as the recipient MAC address in the packet received by the gateway 108 (so that the packet is relayed). On the contrary, when the packet is transmitted to the port p4' of the virtual node VN3 represented by the VNP through the virtual link VL23, the MAC address is notified in communication with the real node N12 104 so that the MAC address corresponding to the port p4 of the virtual node VNP as the relay point is designated as the recipient MAC address in the packet. When the MAC address of the gateway 108 side is z.z.z.z.z.z and the MAC address of the N12 side is u.u.u.u.u.u, the former is designated in the link setting request 233 as illustrated in FIG. 14C and the latter is designated in the link setting reply 234 as illustrated in FIG. 14D.

For the first and second settings, the gatekeeper 107 transmits the path setting request 241 to the gateway 108 and receives the path setting reply 242 from the gateway 108. A content of the path setting request 241 when the VLAN ID in the first setting is 100, the MAC address of the gateway 108 side is x.x.x.x.x.x, the MAC address of the N12 side is y.y.y.y.y.y, the VLAN ID in the second setting is 101, the MAC address of the gateway 108 side is z.z.z.z.z.z, and the MAC address of the N12 side is u.u.u.u.u.u is illustrated in FIG. 15A. When the gateway 108 receives the path setting request 241, the VLAN path is set by using the information.

The gateway 108 generates some of the address correspondence tables 901 to 904 between the in-domain and interdomain addresses of the gateway 108 at the time of receiving the path setting request 241. That is, an old VLAN ID and an old MAC address, that is, a VLAN ID and a MAC address before conversion and a new VLAN ID and a new MAC address, that is, a VLAN ID and a MAC address after conversion are stored in the correspondence table which the gateway 108 is using among the correspondence tables 901 to 904 between the in-domain and interdomain addresses by using the link names VL14 and VL23 as the key.

Further, the description relates to the case of the processing of the slice information 501 in the domain D1, but in the case of the processing of the slice information 503 in the domain D2, the gatekeeper 117 transmits the path setting request 243 to the gateway 118 and receives the path setting reply 244 from the gateway 108.

(In-domain Setting by IP Tunnel (GRE, and the Like) for Interdomain Virtual Link)

Meanwhile, a tunnel on an Internet protocol in the in-domain part of the virtual link VL14, that is, the part from the virtual node VN1 to the gateway, for example, a generic routing encapsulation (GRE) tunnel is usable and when the GRE tunnel is selected, the coincidence of the VLAN ID is not required, but the gatekeeper 107 performs the first setting with respect to the gateway 108 so that a GRE key is designated as the packet instead of the VLAN ID and the IP address is designated as the packet instead of the MAC address, and performs communication with the real node N11 103, that is, the link setting request 231 and the link setting reply 232. When 1000 is used as the GRE key, the value is designated in the link setting request 231 as illustrated in FIG. 14E. When the IP address of the gateway 108 side is x.x.x.x and the IP address of the N11 side is y.y.y.y, the former is designated in the link setting request 231 as illustrated in FIG. 14E and the latter is designated in the link setting reply 232 as illustrated in FIG. 14F.

Further, when the tunnel on the Internet protocol in the in-domain part of the virtual link VL23, that is, the part from the virtual node VN2 to the gateway is used, the coincidence of the VLAN ID is not required, but the gatekeeper 107 performs the second setting with respect to the gateway 108, in which the GRE key is designated as the packet instead of the VLAN ID and the IP address is designated as the packet instead of the MAC address, and performs communication with the real node N12 104, that is, the link setting request 233 and the link setting reply 234. When 1000 is used as the GRE key, the value is designated in the link setting request 233 as illustrated in FIG. 14E. When the IP address of the gateway 108 side is z.z.z.z and the IP address of the N12 side is u.u.u.u, the former is designated in the link setting request 233 as illustrated in FIG. 14G and the latter is designated in the link setting reply 232 as illustrated in FIG. 14H.

For the first and second settings, the gatekeeper 107 transmits the path setting request 241 to the gateway 108 and receives the path setting reply 242 from the gateway 108. A content of the path setting request 241 when the GRE key in the first setting is 1000, the IP address of the gateway 108 side is x.x.x.x, the IP address of the N11 side is y.y.y.y, the GRE key in the second setting is 1001, the IP address of the gateway 108 side is z.z.z.z, and the IP address of the N12 side is u.u.u.u is illustrated in FIG. 15B. When the gateway 108 receives the path setting request 241, a GRE tunnel is set by using the information.

The gateway 108 generates some of the address correspondence tables 901 to 904 between the in-domain and interdomain addresses of the gateway 108 at the time of receiving the path setting request 241. That is, an old GRE key and an old IP address, that is, a GRE key and an IP address before conversion and a new GRE key and a new IP address, that is, a GRE key and an IP address after conversion are stored in the correspondence table which the gateway 108 is using among the correspondence tables 901 to 904 between the in-domain and interdomain addresses by using the link names VL14 and VL23 as the key.

(Slice Information Conversion of Transmitting-Side Gatekeeper)

Continuously, in step 303, a content of the interdomain asking request 213 is flattened. That is, when the slice information 501 is input, the slice information is converted into the format of the standard slice information 502. That is, the virtual nodes VN3 and VN4 surrounded by the virtual node VNP are taken out the VNP and the VNP is erased.

(Transmission of Slice Information to Receiving Side (Domain D2))

Finally, in step 304, the content of the interdomain asking request 213 and interdomain link information of the own domain side are transmitted to the predetermined other domain. In detail, the flattened standard slice information 502 is put in the interdomain asking 214 and transmitted to the gatekeeper of the counterpart domain. That is, the gatekeeper 107 transmits the slice information to the gatekeeper 117 and the gatekeeper 117 transmits the slice information to the gatekeeper 107. During these transmissions, mounting information of the interdomain virtual link is transmitted to the gatekeeper of the counterpart domain. That is, when the VLAN is used to mount the interdomain virtual link, as accompanying information of the virtual links VL14 and VL23, the VLAN ID corresponding thereto, the MAC address corresponding to the port p3 of the virtual node VNP and the MAC address corresponding to the port p4 of the virtual node VNP as port information of a virtual link termination are together notified. Further, when the GRE is used to mount the interdomain virtual link, the IP address corresponding to each port is notified. From this point, execution of the in-domain setting management program 201 ends.

Part 1 Ends.

(Processing of Receiving-Side Gatekeeper)

Figure 4:
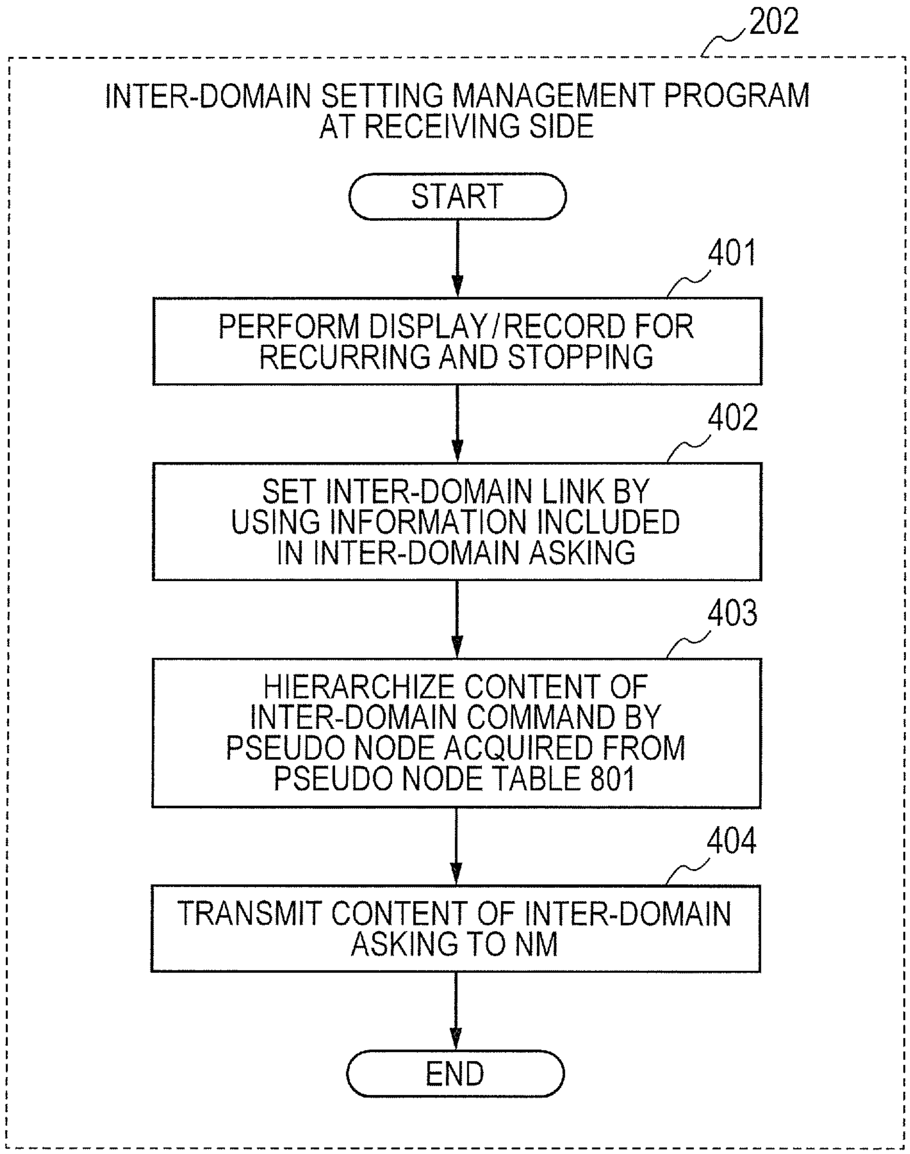
FIG. 4 is a flowchart illustrating a sequence of a receiving-side interdomain setting management program 202.

FIG. 4 is a flowchart illustrating a processing sequence of the receiving-side interdomain setting management program 202 in the gatekeepers 117 and 107. When execution of the receiving-side interdomain setting management program 202 starts, displaying/recording for recursive stop is first performed in step 401. A detailed method therefor will be described below.

(Interdomain Virtual Link Setting in Receiving-Side Gatekeeper)

Continuously, in step 402, an interdomain link is set by using information included in interdomain asking. In detail, paths corresponding to the virtual links VL14 and VL23 in the slice information 502 are set. In the setting, a gateway through which the interdomain link needs to pass is first determined. Since the gateway 118 is present as the gateway between the domains D1 and D2, it is determined that the gateway 118 is to be used. When the plurality of gateways is usable, the load may be distributed by selecting a predetermined gateway among the plurality of gateways and further, when the method in which the path is automatically selected such as the IP routing is used, automatic selection may be adopted.

Next, a mounting method of the interdomain virtual link is determined and a path between the gateway 108 and the gateway 118 is set. In the setting, the mounting method may be independently determined in the domain D1 and the domain D2 among the virtual link mounting methods which are usable between the domains D1 and D2.

(Interdomain Virtual Link Setting by VLAN)

When the virtual link VL14 is implemented by the VLAN, the VLAN ID of the port p3 of the virtual node VN4 in the own domain (domain D2) coincides with that of the port p1 in the counterpart domain (domain D1) included in the interdomain asking 214. As a result, the first setting is performed in the gateway 108. Further, when the packet is transmitted to the port p1 in the counterpart domain through the virtual link VL14, the gateway 118 is set so that the MAC address of the gateway 108 corresponding to the port p1 is designated as the recipient MAC address in the packet. That is, third setting is performed so that a header of a packet having the gateway 118 as a recipient is converted and transmitted to the gateway 108. A method for the packet header conversion will be described below.

Further, when the virtual link VL23 is implemented by the VLAN, the VLAN ID of the port p4 of the virtual node VN3 in the own domain (domain D2) coincides with that of the port p2 in the counterpart domain (domain D1) included in the interdomain asking 214. As a result, the second setting is performed in the gateway 108. Further, when the packet is transmitted to the port p2 in the counterpart domain through the virtual link VL23, the gateway 118 is set so that the MAC address of the gateway 108 corresponding to the port p2 is designated as the recipient MAC address in the packet. That is, fourth setting is performed so that the header of the packet having the gateway 118 as the recipient is converted and transmitted to the gateway 108.

For the first to fourth settings, the gatekeeper 117 transmits the interdomain path setting request 245 to the gateway 118 and receives the interdomain path setting reply 246 from the gateway 118. A content of the interdomain path setting request 245 when the VLAN ID in the first setting is 102, the MAC address is a.a.a.a.a.a, the VLAN ID in the second setting is 103, and the MAC address is c.c.c.c.c.c is illustrated in FIG. 15C. When the gateway 118 receives the interdomain path setting request 245, the VLAN path is set by using the information.

The gateway 118 generates some of the address correspondence tables 901 to 904 between the in-domain and interdomain addresses of the gateway 118 at the time of receiving the path setting request 243. That is, the old VLAN ID and the old MAC address, that is, the VLAN ID and the MAC address before conversion and the new VLAN ID and the new MAC address, that is, the VLAN ID and the MAC address after conversion are stored in the correspondence table which the gateway 118 is using among the correspondence tables 901 to 904 between the in-domain and interdomain addresses by using the link names VL14 and VL23 as the key.

(Interdomain Virtual Link Setting by IP Tunnel (GRE, and the Like))

Meanwhile, when the virtual link VL14 is implemented by the tunnel on the Internet protocol, for example, the GRE tunnel, the coincidence of the VLAN ID is not required, but the first setting is performed in the gateway 118 in which the IP address is designated as the packet instead of the MAC address. Further, the third setting is performed so that the header of the packet having the gateway 118 as the recipient is rewritten and transmitted to the gateway 108. In addition, when the virtual link VL23 is implemented by the tunnel on the Internet protocol, the coincidence of the VLAN ID is not required, but the second setting is performed in the gateway 118 in which the GRE key is designated as the packet instead of the VLAN ID and the IP address is designated as the packet instead of the MAC address. Further, the fourth setting is performed so that the header of the packet having the gateway 118 as the recipient is rewritten and transmitted to the gateway 108.

For the first to fourth settings, the gatekeeper 117 transmits the path setting request 243 to the gateway 118 and receives the path setting reply 244 from the gateway 118. A content of the interdomain path setting request 245 when the GRE key in the first setting is 1002, the IP address of the gateway 118 side is a.a.a.a, the IP address of the gateway 108 side is b.b.b.b, the GRE key in the second setting is 1003, and the IP address of the gateway 118 side is c.c.c.c, and the IP address of the gateway 108 side is d.d.d.d is illustrated in FIG. 15D. When the gateway 118 receives the interdomain path setting request 245, the GRE tunnel is set by using the information.

The gateway 118 generates some of the address correspondence tables 901 to 904 between the in-domain and interdomain addresses of the gateway 118 at the time of receiving the path setting request 241. That is, the old GRE key and the old IP address, that is, the GRE key and the IP address before conversion and the new GRE key and the new IP address, that is, the GRE key and the IP address after conversion are stored in the correspondence table which the gateway 118 is using among the correspondence tables 901 to 904 between the in-domain and interdomain addresses by using the link names VL14 and VL23 as the key.

(Slice Information Conversion of Receiving-Side Gatekeeper)

Further, in step 403, a content of the interdomain asking is hierarchized. A pseudo node name needs to be inserted into a slice definition in hierarchizing, but the pseudo node name used herein is acquired from a pseudo node table 801 (the pseudo node table 801 will be described below). That is, a virtual node name corresponding to the domain D1 is determined (determined as the VNQ) and the virtual nodes VN1 and VN2 are surrounded by the virtual node VNQ.

(Transmission of Slice Information to Network Management Server)

Finally, in step 404, the content of the interdomain asking is transmitted to the NM 112. In detail, the hierarchized standard slice information 501 is put in the slice request 215 and transmitted to the network management server 112 of the own domain. From this point, execution of the receiving-side interdomain setting management program 202 ends.

(Processing of Transmitting-Side (Domain D1) Gatekeeper 2/2)

(Interdomain Virtual Link Setting in Transmitting-Side Gatekeeper)

Figures 7, 8:
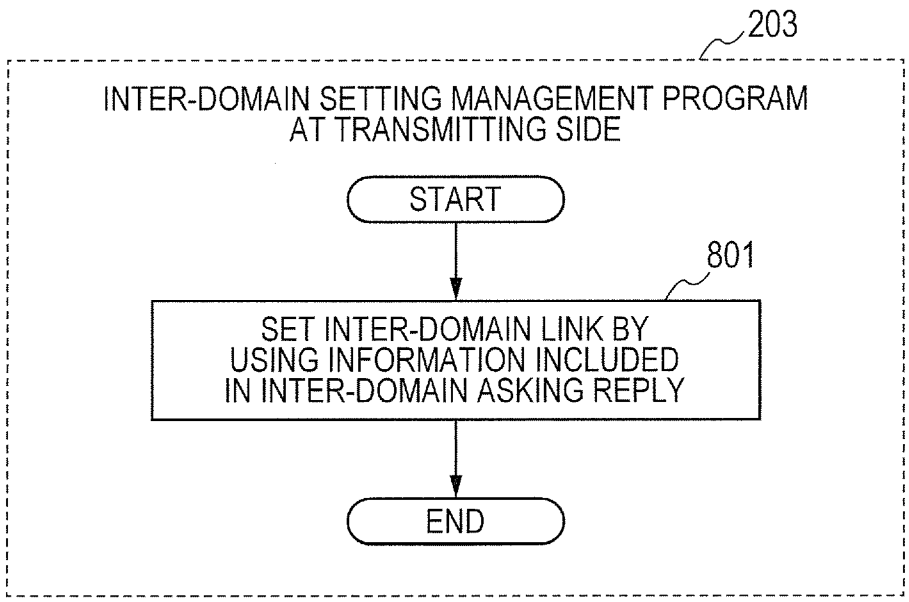
FIG. 7 is a diagram illustrating a content of a pseudo node table 701.
FIG. 8 is a flowchart illustrating a sequence of a transmitting-side interdomain setting management program 203.

FIG. 8 is a flowchart illustrating a processing sequence of the transmitting-side interdomain setting management program 203 in the gatekeepers 117 and 107. When execution of the transmitting-side interdomain setting management program 203 starts, the interdomain link is set by using the information included in the interdomain asking reply in step 801. In detail, interdomain paths corresponding to the virtual links VL14 and VL23 in the slice information 502 are set. The gateway 118 has been already selected as the gateway and thus is used.

(Interdomain Virtual Link Setting by VLAN)

When the virtual link VL14 is implemented by the VLAN, the VLAN ID of the port p1 of the virtual node VN2 in the own domain (domain D1) coincides with that of the port p3 in the counterpart domain (domain D2) included in the interdomain asking reply 224. As a result, the first setting is performed in the gateway 108. Further, when the packet is transmitted to the port p3 in the counterpart domain through the virtual link VL14, the gateway 108 is set so that the MAC address of the gateway 118 corresponding to the port p3 is designated as the recipient MAC address in the packet. That is, the third setting is performed so that a header of a packet having the gateway 108 as the recipient is rewritten and transmitted to the gateway 118.

Further, when the virtual link VL23 is implemented by the VLAN, the VLAN ID of the port p2 of the virtual node VN1 in the own domain (domain D1) coincides with that of the port p3 in the counterpart domain (domain D2) included in the interdomain asking reply 224. As a result, the second setting is performed in the gateway 108. Further, when the packet is transmitted to the port p3 in the counterpart domain through the virtual link VL23, the gateway 108 is set so that the MAC address of the gateway 108 corresponding to the port p3 is designated as the recipient MAC address in the packet. That is, the fourth setting is performed so that the header of the packet having the gateway 108 as the recipient is rewritten and transmitted to the gateway 118.

For the first to fourth settings, the gatekeeper 117 transmits the interdomain path setting request 245 to the gateway 118 and receives the interdomain path setting reply 246 from the gateway 118. Further, the gateway 118 generates some of the address correspondence tables 901 to 904 between the in-domain and interdomain addresses of the gateway 118 at the time of receiving the path setting request 241.

(Interdomain Virtual Link Setting by IP Tunnel (GRE, and the Like))

Meanwhile, when the virtual link VL14 is implemented by the tunnel on the Internet protocol, for example, the GRE tunnel, the coincidence of the VLAN ID is not required, but the first setting is performed in the gateway 108 in which the IP address is designated as the packet instead of the MAC address. Further, the fourth setting is performed so that the header of the packet having the gateway 108 as the recipient is rewritten and transmitted to the gateway 118.

When the virtual link VL23 is implemented by the tunnel on the Internet protocol, the coincidence of the VLAN ID is not required, but the second setting is performed in the gateway 108 in which the IP address is designated as the packet instead of the MAC address. Further, the third setting is performed so that the header of the packet having the gateway 108 as the recipient is rewritten and transmitted to the gateway 118.

For the first to fourth settings, the gatekeeper 117 transmits the path setting request 243 to the gateway 118 and receives the path setting reply 244 from the gateway 118. Further, the gateway 108 generates some of the address correspondence tables 901 to 904 between the in-domain and interdomain addresses of the gateway 108 at the time of receiving the path setting request 241.

(Stop of Infinite Recursion)

Hereinafter, a method of stopping infinite recursion of interdomain communication, that is, step 401 and step 301 will be described in detail. As described above, the gatekeeper 117 judges that the slice information need not be transmitted to the domain D1 in the in-domain setting management processing 301, but when it is assumed that the judgment is not performed, the slice information is transmitted to the domain D1 and although setting in the domain D1 has been already completed, setting is executed again. Moreover, the slice information is further transmitted to the domain D2 and transmission between the domains D1 and D2 is infinitely repeated. Three methods for stopping the infinite recursion and preventing duplicated setting from being performed will be described with reference to FIG. 12.

Figure 12A:
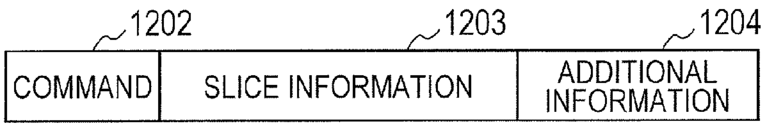
FIG. 12A is a diagram illustrating the structure of a management message.
Figure 12B:
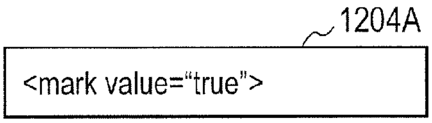
FIG. 12B is a diagram illustrating one example of a content of marking additional information included in the management message.
Figure 12C:
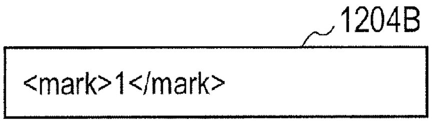
FIG. 12C is a diagram illustrating another example of the content of the marking additional information included in the management message.
Figure 12D:
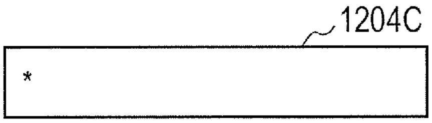
FIG. 12D is a diagram illustrating one example of a content of counter information included in the management message.
Figure 12E:
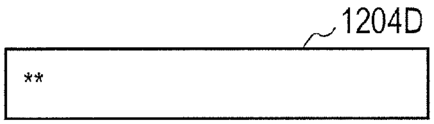
FIG. 12E is a diagram illustrating another example of the content of the counter information included in the management message.

Even in any case, the management message 1201 is constituted by the classification 1202, the slice information 1203, and the additional information 1204. The classification 1202 represents a classification of the management message 1201. In a management message for slice generation, the classification 1202 includes a value that means 'slice generation'. A predetermined value of the additional information 1204 is empty or 0, but the predetermined value may include a value which is neither empty nor 0 as described below in order to stop the infinite recursion. In FIG. 12A, the additional information 1204 is provided independently from the slice information 1203, but the additional information 1204 may be put in the slice information 1203.

(Method by Identifier)

A first method is a method used by recording an order identifier (request identifier) included in a slice identifier or message included in the slice information. In this method, in step 401, identification information included in the management message which the gatekeeper 117 receives from the other domain is recorded in an internal database (a table on a main storage, and the like) of the gatekeeper 117 or an external database (a relationship database, and the like). Further, in step 301, when the gatekeeper 117 receives the management message from the pseudo node 115 of the own domain, the identification information included in the database is retrieved by using the identification information included in the slice information included in the management message as the key. As a result, when the same identification information is not found, it is judged that the management message is transmitted from the own domain, but when the same identification information is found, it is judged that the management message is not transmitted from the own domain. As a result, the management message transmitted from the own domain is not transferred to the NM 112 and the infinite recursion may be prevented. When this method is used, an applicable network configuration is not limited as in the first and second methods.

In regard to processing which is executed only once for each slice, for example, an initial definition of the slice, and the like, a slice name may be used as the identification information. However, in order to use the slice name as the identifier, a slice identifier needs to be uniquely determined in all of the domains. When the NM 112 and the NM 102 handle the slice name untouchably, the NM 112 and the NM 102 may be simply compared in retrieval. However, when the NM 112 and the NM 102 rewrite the slice name, the gatekeepers 117 and 107 need to compare a slice name included in a database which is rewritten according to a rewriting method with the slice name included in the management message. For example, it is understood that the NM 112 and the NM 102 add a domain name to the slice name as a prefix, but in this case, the NM 112 and the NM 102 add the domain name to the slice name included in the database before comparison or remove the prefix from the slice name included in the management message.

In regard to processing which is executed plural times for each slice, for example, a change definition of the slice, and the like, the order identifier may be used as the identification information. However, in order to use the order identifier, first, the order identifier needs to be uniquely determined in all of the domains. Second, when the message is transmitted, the order identifier needs to be preserved.

When the definite identification information such as the slice name is not able to be used, the following method may be selected. That is, when the management message is received from the other domain, all of the slice information is recorded and when the management message is received from the pseudo node 115, it may be found whether similarity between the received slice information and the recorded slice information is equal to or more than a predetermined value. However, since this method does not have definition, a method such as a counter (third method) to be described below is preferably used concurrently.

(Method by Marking)

A second method is a method of performing marking in the management message. In this method, the gatekeeper 117 performs marking in the management message received from the other domain and transfers the message with the mark to the NM 112, in step 401. Further, in step 301, when the gatekeeper 117 receives the management message with no mark from the pseudo node 115 of the own domain, the gatekeeper 117 judges that the management message needs to be discarded, but when the gatekeeper 117 receives the management message with the mark, the gatekeeper 117 judges that the management message need not be discarded. As a result, the management message transmitted from the own domain is not transferred to the NM 112 and the infinite recursion may be prevented.

The marking may be performed as follows. That is, 1-bit information that means 0 (false) or 1 (true) is buried in the management message. When the management message is described by an XML, the management message includes marking additional information 1204A of FIG. 12B or marking additional information 1204B of FIG. 12C.

The first method is the simplest, but information which arrives from the other domain is not transmitted to the second other domain. As a result, when three or more domains are bound by a line of beads, the method may not be applied.

(Method by Counter (TTL))

A third method is a method of mounting a counter on the management message. In this method, the gatekeeper 117 counts up the counter included in the management message received from the other domain and transfers the count-up counter to the NM 112, in step 401. When the counter is not included, the counter including an initial value (0) is inserted. Further, in step 301, when the gatekeeper 117 receives a management message in which the counter is equal to or more than a predetermined value, from the pseudo domain 115 of the own domain, the gatekeeper 117 judges that the management message needs to be discarded, but when the gatekeeper 117 receives the management message with the mark, the gatekeeper 117 judges that the management message need not be discarded.

The counter may be implemented as follows. That is, the initial value is set to 0 (alternatively, an empty string) and the counter is counted up whenever the counter passes through the gatekeepers 117 and 107 (like 1, 2, 3, . . . , or 1204C of FIGS. 12D and 1204D of FIG. 12E, or counted down).

An advantage of the second method is that recursion may be allowed at the predetermined of times, and thus the second method may cope with even the network configuration such as a line of beads. That is, in step 301, when it is judged whether the value of the counter is more than a predetermined value (alternatively, whether the value of the counter is 0), repetition up to the predetermined number of times may be allowed. However, in the case of a line of beads, the number of beads has an upperlimit value.

Hereinafter, selection of the pseudo node in step 403 and the pseudo node table 701 will be described. The gatekeeper 117 receives the slice information 502 and converts the received slice information 502 into the slice information 503. In this case, in step 403, a pseudo node name inserted into the slice information 503 needs to be selected. The pseudo node table 701 used due thereto will be described with reference to FIG. 7. In the pseudo node table 701, it is recorded that pseudo nodes corresponding to the domains D1 and D2 adjacent to the domain D2 are P21 115 and P22 116, respectively. The pseudo node table 701 is generated when the network configuration is determined. In step 403, by using the pseudo node table 701, when the management message arrives from the domain D1, the pseudo node corresponding to the virtual node VNQ is set as P21 115 and when the management message arrives from the domain D3, the pseudo node corresponding to the virtual node VNQ is set as P22 116.

(Sequence Complementation 2)

Figure 16:
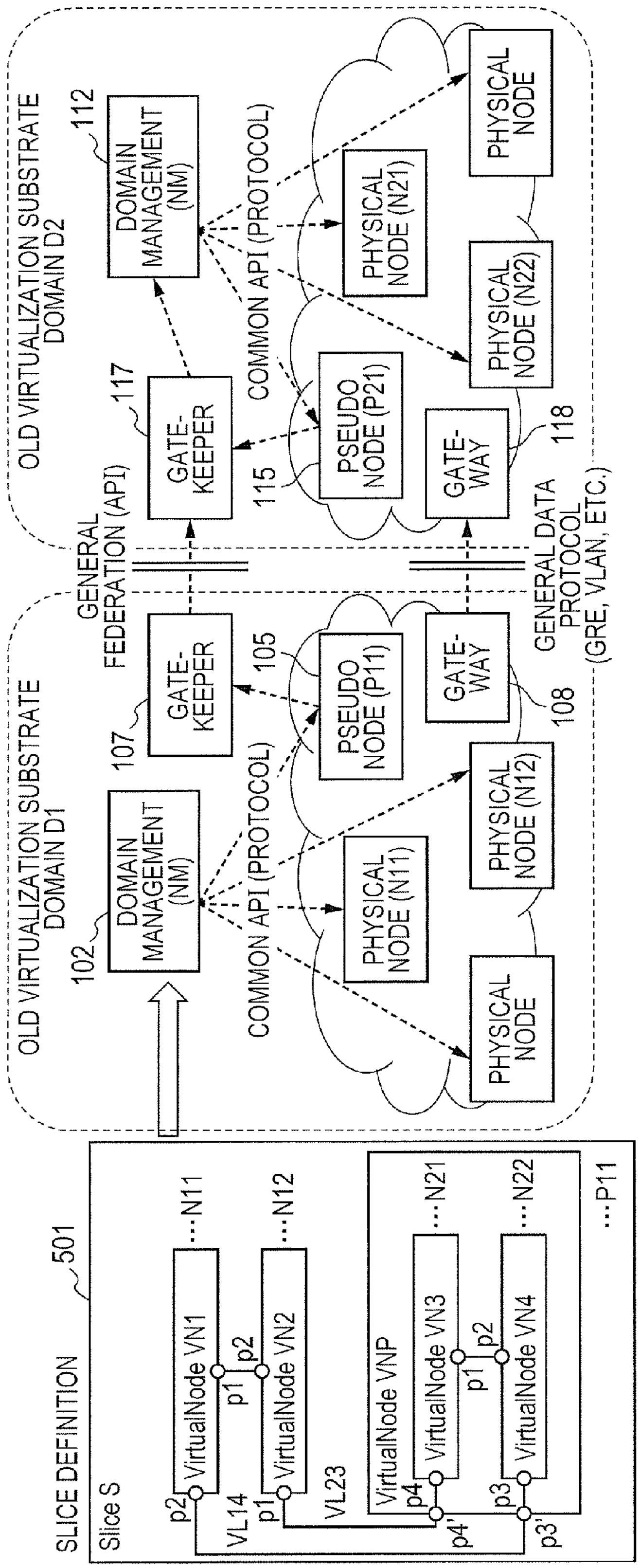
FIG. 16 is a complementary diagram of a first part of a sequence when the setting, management, and operation illustrated in FIG. 2 are performed.
Figure 17:
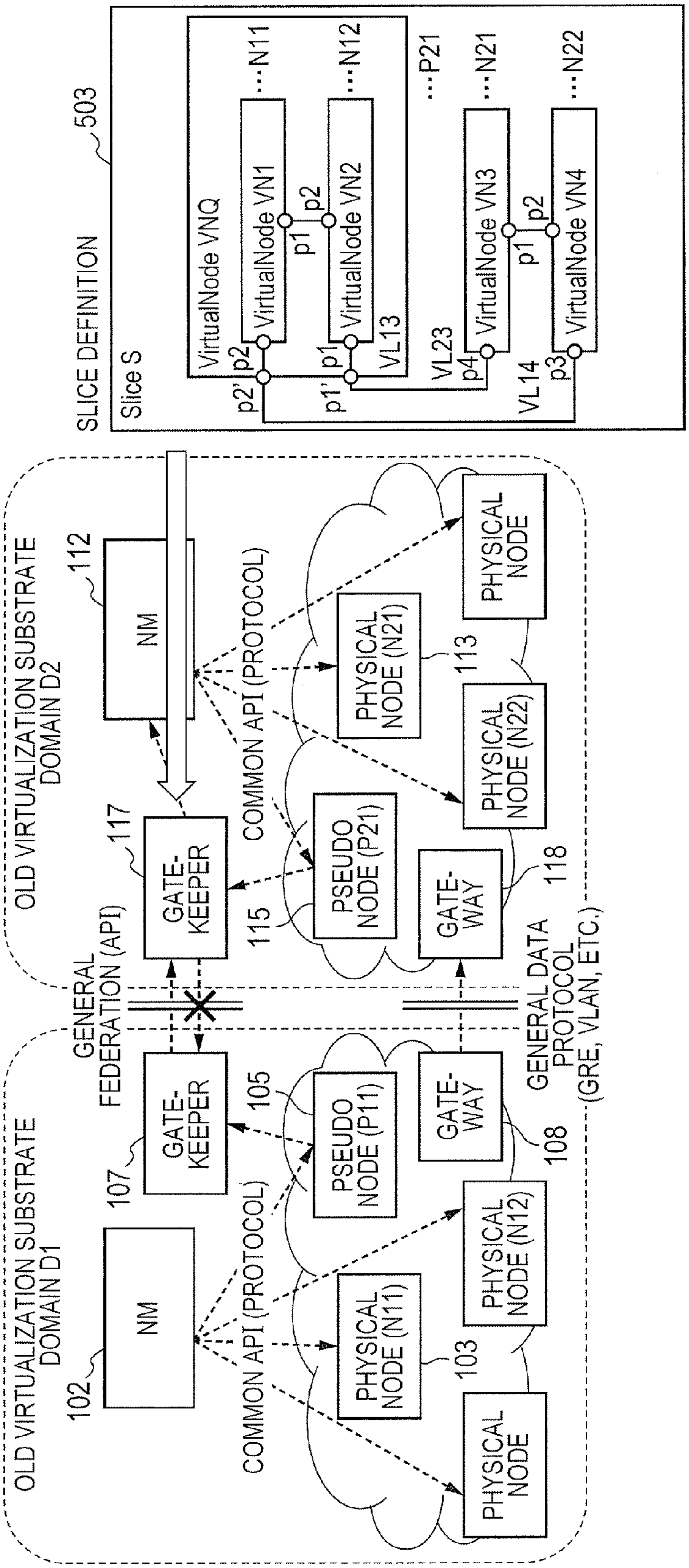
FIG. 17 is a complementary diagram of a second part of the sequence when the setting, management, and operation illustrated in FIG. 2 are performed.

The sequence of the setting, management, and operation described with reference to FIG. 2 is complemented with reference to FIGS. 16 and 17. FIG. 16 illustrates a flow from the slice request 211 to the slice request 215. That is, a message including the slice definition 501 input from the console 101 is input, distributed by an API (protocol) which is common to the physical node and the pseudo node, and reaches the NM 112 through conversion of the slice definition. FIG. 17 illustrates a flow from the slice request 215 to the interdomain asking request 217. The slice definition 503 included in the slice request 215 is described at the right side of FIG. 17, but the slice definition 503 is distributed by the API (protocol) which is common to the physical node and the pseudo node from the NM 112.

Figure 18:
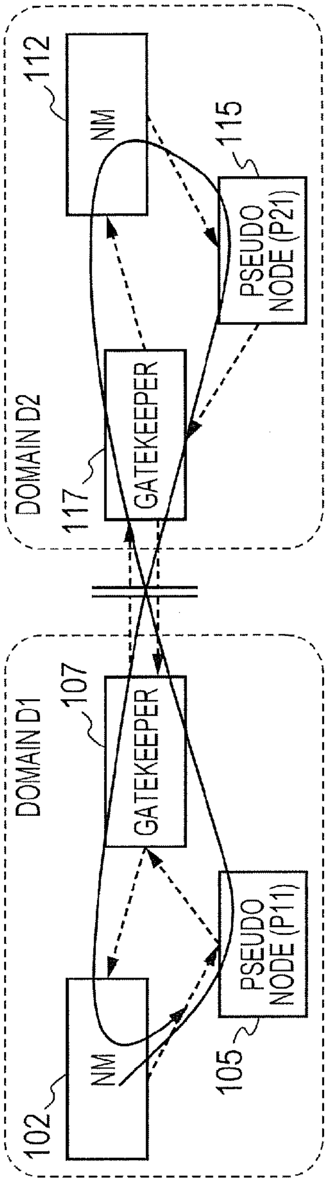
FIG. 18 is an explanatory diagram of infinite recursion which can occur in the setting, management, and operation when a program without a step of stopping the infinite recursion is used.

FIG. 18 illustrates infinite recursion which may occur in the setting, management, and operation when a program without including a step of stopping the infinite recursion is used. The setting and management message is transmitted from the NM 102 to the pseudo node 105, the gatekeeper 107, the gatekeeper 117, the domain management 112, the pseudo node 115, and the gatekeeper 117 in sequence, but when there is no step of stopping the infinite recursion, the setting and management message is transmitted to the gatekeeper 107 and the NM 102. The transmission may be infinitely repeated.

Figure 19:
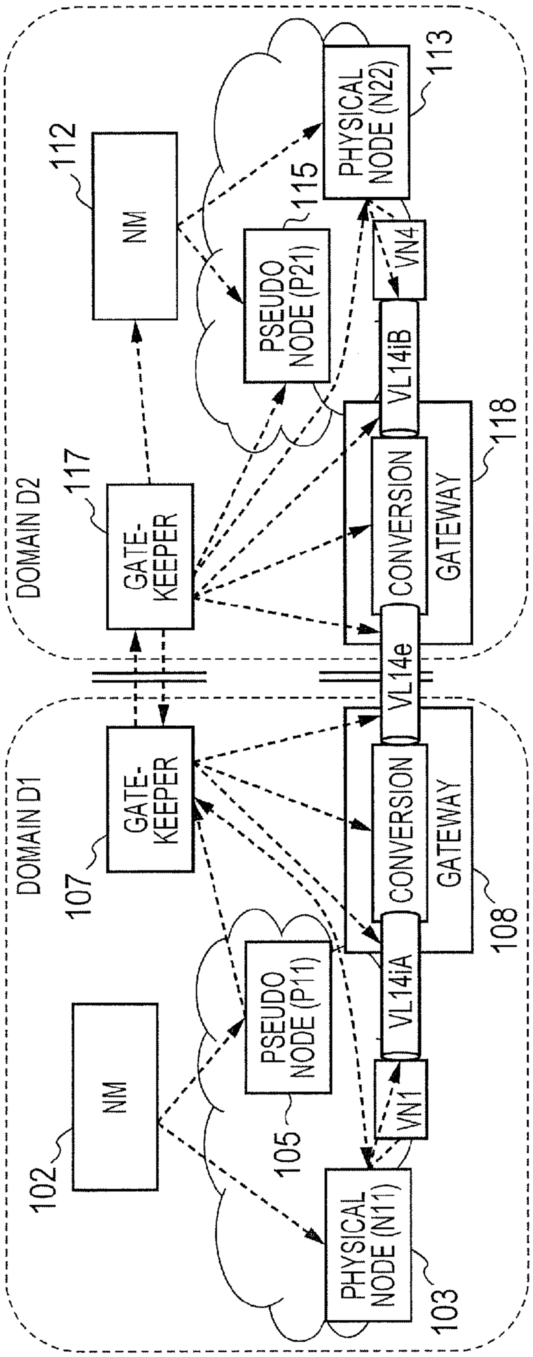
FIG. 19 is the relationship between the sequence of the setting, management, and operation illustrated in FIG. 2 and an interdomain path corresponding to a virtual link VL14 generated during the sequence.

FIG. 19 illustrates the relationship between the sequence of the setting, management, and operation illustrated in FIG. 2 and an interdomain path corresponding to the virtual link VL14 generated during the sequence. During this process, a part of the VL14 in the domain D1 is generated by setting from the gatekeeper 107 to the gateway 108 and communication between the gatekeeper 107 and the physical node (N11 ) 103. A part of the VL14 between the domains D1 and D2 is generated by the setting from the gatekeeper 107 to the gateway 108 and setting from the gatekeeper 117 to the gateway 118. Further, a part of the VL14 in the domain D2 is generated by the setting from the gatekeeper 117 to the gateway 118 and communication between the gatekeeper 117 and the physical node (N21 ) 115.

The invention claimed is:

1. A method for managing a network system including a first network domain, a second network domain, and a federation system configured to perform setting of a node that belongs to the second network domain by receiving domain setting management information regarding the second network domain from the outside of the second network domain, wherein the first network domain includes a plurality of nodes, a pseudo node and a gatekeeper for federation with the second network domain, and a first management node managing the plurality of nodes and the pseudo nodes, the method comprising:

receiving, by the first management node, first domain setting management information including node setting information of the plurality of nodes from a console connected to the first network domain;

transmitting, by the first management node, the first domain setting management information to the plurality of nodes;

setting each of the plurality of nodes based on the node setting information included in the first domain setting management information, wherein the first domain setting management information includes second node setting information regarding the pseudo node, the second node setting information includes identification information of the pseudo node and second domain setting management information regarding the second network domain;

transmitting, by the first management node, the first domain setting management information to the pseudo node;

transmitting, by the pseudo node, the second node setting information extracted from the first domain setting management information to the gatekeeper;

transmitting, by the gatekeeper, information other than the identification information of the pseudo node extracted from the second node setting information to the federation system; and performing, by the federation system, setting of a node that belongs to the second network domain by using the second domain setting management information included in the information other than the identification information of the pseudo node extracted from the second node setting information received from the gatekeeper of the first network domain.

2. The method for managing a network system according to claim 1, wherein the pseudo node transmits information acquired by subtracting the node setting management information of the pseudo node from the first domain setting information regarding the first network domain at the time of transmitting the node setting information regarding the pseudo node to the gatekeeper.

3. The method for managing a network system according to claim 1, wherein the gatekeeper performs control and management of the first network domain by transmitting the second domain setting management information to the first management node at the time of receiving the second domain setting management information of the first network domain from the federation system.

4. The method for managing a network system according to claim 3, wherein when the pseudo node receives the second domain setting management information of the first network domain and third domain setting management information of the second network domain from the federation system, the identification information of the pseudo node is added to the third domain setting management information to acquire the setting management information of the pseudo node, which is converted into a format without including information regarding a network node of the second network domain and transmitted to the first management node.

5. The method for managing a network system according to claim 1, wherein the first domain setting management information includes link information between the plurality of network nodes and the pseudo node and the gatekeeper transmits a command to the gateway according to the link information to generate a link between the first network domain and the second network domain.

6. The method for managing a network system according to claim 5, wherein the first domain setting management information includes information to generate and manage a virtual node and a virtual link of a virtual network and the link information is information to generate and manage an interdomain virtual link, and wherein communication setting for the interdomain virtual link is performed by the link generation to generate and manage a virtual network that extends the first domain and the second domain.

7. The method for managing a network system according to claim 3, wherein when the pseudo node receives the second domain setting management information of the first network domain from the federation system, the second domain setting management information is transmitted to the first management node in the case where it is not recognized that the second domain setting management information is the same as the first domain setting management information.

8. The method for managing a network system according to claim 7, wherein when the pseudo node receives the second domain setting management information, an identifier of the second domain setting management information is stored, when the pseudo node receives the first domain setting management information, the first domain setting management information and the stored information are collated with each other, and when both information coincides with each other, it is recognized that the second domain setting management information is the same as the first domain setting management information.

9. The method for managing a network system according to claim 7, wherein when the pseudo node receives the first domain setting management information, an identifier of the second domain setting management information is stored, when the pseudo node receives the second domain setting management information, the second domain setting management information and the stored information are collated with each other, and when both information coincides with each other, it is recognized that the second domain setting management information is the same as the first domain setting management information.

10. The method for managing a network system according to claim 7, wherein when the pseudo node receives the first domain setting management information, marking is performed in the received first domain setting management information and when the pseudo node receives the second domain setting management information, the second domain setting management information is transmitted to the first management node in the case where marking is not performed in the second domain setting management information.

11. The method for managing a network system according to claim 7, wherein when the pseudo node receives the second domain setting management information, marking is performed in the received second domain setting management information and when the pseudo node receives the first domain setting management information, the second domain setting management information is transmitted to the first management node in the case where marking is not performed in the first domain setting management information.

12. The method for managing a network system according to claim 3, wherein:

when the pseudo node receives the first domain setting management information, a counter including a predetermined value is added to the second domain setting management information and whenever domain setting management information passes through the first network domain and the second network domain, the counter is configured to be counted down, and when the pseudo node receives the second domain setting management information, the counter including the second domain setting management information is counted up and when the pseudo node receives the first domain setting management information, the second domain setting management information is transmitted to the first control and management node only in the case where the counter is not more than a predetermined value.

13. The method for managing a network system according to claim 1, wherein the first domain setting management information includes the node setting management information of the pseudo node, the node setting management information of the pseudo node includes the second domain setting management information regarding the second network domain, the pseudo node transmits the first domain setting management information to the gatekeeper, and when the gatekeeper receives the first domain setting management information, the second setting management information is transmitted to the second network domain.

14. The method for managing a network system according to claim 13, wherein:

when a third network domain is present other than the first and second network domains and a second pseudo node corresponding to the third network domain is present, in the case where the gatekeeper receives the second domain setting management information of the first network domain, the second domain setting management information is set as setting management information of the first pseudo node when the second domain setting management information is received from the federation system and the second domain setting management information is set as setting management information of the second pseudo node when the second domain setting management information is received from a second federation system of the third network domain.

* * * * *